US012811955B2

(12) United States Patent
Tsukamoto et al.

(10) Patent No.: US 12,811,955 B2
(45) Date of Patent: Nov. 24, 2026

(54) IN-VEHICLE DEVICE, DETECTION DEVICE, TRANSMISSION CONTROL METHOD, AND DETECTION METHOD

(71) Applicants: Sumitomo Electric Industries, Ltd., Osaka (JP); Sumitomo Wiring Systems, Ltd., Yokkaichi (JP); AutoNetworks Technologies, Ltd., Yokkaichi (JP)

(72) Inventors: Hiroyuki Tsukamoto, Osaka (JP); Hiroshi Ueda, Yokkaichi (JP)

(73) Assignees: Sumitomo Electric Industries, Ltd., Osaka (JP); Sumitomo Wiring Systems, Ltd., Yokkaichi (JP); AutoNetworks Technologies, Ltd., Yokkaichi (JP)

( * ) Notice: Subject to any disclaimer, the term of this patent is extended or adjusted under 35 U.S.C. 154(b) by 188 days.

(21) Appl. No.: 18/572,795

(22) PCT Filed: May 31, 2022

(86) PCT No.: PCT/JP2022/022060
§ 371 (c)(1),
(2) Date: Dec. 21, 2023

(87) PCT Pub. No.: WO2022/270240
PCT Pub. Date: Dec. 29, 2022

(65) Prior Publication Data

US 2024/0291832 A1 Aug. 29, 2024

(30) Foreign Application Priority Data

Jun. 24, 2021 (JP) ................................. 2021-104868

(51) Int. Cl.
*H04L 12/40* (2006.01)
*H04L 9/40* (2022.01)
(Continued)

(52) U.S. Cl.
CPC .......... *H04L 63/1416* (2013.01); *H04L 12/66* (2013.01); *H04L 63/123* (2013.01); *B60R 16/023* (2013.01); *H04L 67/12* (2013.01)

(58) Field of Classification Search
None
See application file for complete search history.

(56) References Cited

U.S. PATENT DOCUMENTS

2014/0068126 A1* 3/2014 Itou ........................ H04L 12/403 710/110
2015/0172306 A1* 6/2015 Kim ........................ H04L 63/08 726/23
(Continued)

FOREIGN PATENT DOCUMENTS

CN 103248672 A * 8/2013
JP 2007243747 A * 9/2007
(Continued)

*Primary Examiner* — Christopher B Robinson
(74) *Attorney, Agent, or Firm* — XSENSUS LLP

(57) ABSTRACT

Provided is an in-vehicle device configured to transmit, in an in-vehicle network, messages to which identification information is added. The messages include a periodic message and an event message. The in-vehicle device includes: a creation unit configured to create the periodic message and the event message; and a transmission control unit configured to transmit the periodic message and the event message created by the creation unit. In transmitting the event message, after a waiting time elapses from a transmission timing of a previously transmitted message among the messages to which the identification information of the same value as that of the event message to be transmitted is added, the transmission control unit transmits the event message to which the identification information of the same value is added. The waiting time is longer than half a transmission cycle of the periodic message and is shorter than the transmission cycle.

20 Claims, 22 Drawing Sheets

(51) Int. Cl.

| | |
|---|---|
| ***H04L 12/66*** | (2006.01) |
| *B60R 16/023* | (2006.01) |
| *H04L 67/12* | (2022.01) |

(56) References Cited

U.S. PATENT DOCUMENTS

| | | | |
|---|---|---|---|
| 2015/0358351 A1 | 12/2015 | Otsuka et al. | |
| 2016/0205194 A1 | 7/2016 | Kishikawa et al. | |
| 2018/0152464 A1* | 5/2018 | Yajima | H04L 67/12 |
| 2019/0068715 A1 | 2/2019 | Kishikawa et al. | |
| 2022/0393903 A1 | 12/2022 | Kamiguchi | |

FOREIGN PATENT DOCUMENTS

| | | | |
|---|---|---|---|
| JP | 2014-146868 A | | 8/2014 |
| JP | 6217469 B2 | * | 10/2017 |
| JP | 2019-126007 A | | 7/2019 |
| JP | 2020-096368 A | | 6/2020 |
| JP | 2021-064921 A | | 4/2021 |
| WO | 2015/170451 A1 | | 11/2015 |
| WO | 2021/095513 A1 | | 5/2021 |

* cited by examiner (MESSAGE TRANSMISSION/RECEPTION AT TIME th)

(MESSAGE TRANSMISSION/RECEPTION AT TIME ti)

(MESSAGE TRANSMISSION/RECEPTION AT TIME tk)

(MESSAGE TRANSMISSION AT TIME tn)

(COMPLETELY DELETED)

IN-VEHICLE DEVICE, DETECTION DEVICE, TRANSMISSION CONTROL METHOD, AND DETECTION METHOD

CROSS-REFERENCE TO RELATED APPLICATIONS

This application is based on PCT filing PCT/JP2022/022060, filed May 31, 2022, which claims priority from Japanese Patent Application No. 2021-104868, filed Jun. 24, 2021, the entire content of each is incorporated herein by reference.

TECHNICAL FIELD

The present disclosure relates to an in-vehicle device, a detection device, a transmission control method, and a detection method.

BACKGROUND ART

PATENT LITERATURE 1 (Japanese Laid-Open Patent Publication No. 2014-146868) discloses a network device as follows. That is, the network device includes a communication unit that receives data, a time management unit that manages a reception time at which the data is received, and a control unit that processes the received data. The network device periodically receives and processes data. The control unit records the reception time, in the time management unit, for each of identifiers included in the data received by the communication unit. When first data, which has the same identifier as reference data and has a data reception interval shorter than a predetermined cycle, has been received, if second data having the same identifier as the first data is received by the time the predetermined cycle elapses from when the reference data is received, the control unit performs a cycle abnormality detection process. When data having the same identifier as the first data has not been received by the time the predetermined cycle elapses, the control unit performs a predetermined process with respect to the first data.

Meanwhile, PATENT LITERATURE 2 (Japanese Laid-Open Patent Publication No. 2020-96368) discloses a fraud detection method as follows. That is, the fraud detection method is used in an in-vehicle network system including a plurality of electronic control units that communicate via an in-vehicle network. This method includes: a reception step of receiving a data frame transmitted on the in-vehicle network; and a verification step of verifying a data value at a predetermined position in the data frame only when an event-driven data frame is received in the reception step and the state of a vehicle having the in-vehicle network system mounted therein is a predetermined state. When the verification is successful in the verification step, the data frame is detected as an authenticated data frame. When the verification fails in the verification step, the data frame is detected as a fraudulent data frame.

CITATION LIST

Patent Literature

PATENT LITERATURE 1: Japanese Laid-Open Patent Publication No. 2014-146868

PATENT LITERATURE 2: Japanese Laid-Open Patent Publication No. 2020-96368

SUMMARY OF THE INVENTION

An in-vehicle device according to the present disclosure is an in-vehicle device configured to transmit, in an in-vehicle network, messages to which identification information is added. The messages include a periodic message and an event message. The in-vehicle device includes: a creation unit configured to create the periodic message and the event message; and a transmission control unit configured to transmit the periodic message and the event message created by the creation unit. In transmitting the event message, after a waiting time elapses from a transmission timing of a previously transmitted message among the messages to which the identification information of the same value as that of the event message to be transmitted is added, the transmission control unit transmits the event message to which the identification information of the same value is added. The waiting time is longer than half a transmission cycle of the periodic message and is shorter than the transmission cycle.

A detection device according to the present disclosure is a detection device used in an in-vehicle network in which messages to which identification information is added are transmitted. The messages include a periodic message and an event message. The detection device includes: a monitoring unit configured to monitor the messages; a detection unit configured to detect presence of an unauthorized message in the in-vehicle network, based on a monitoring result of the monitoring unit; and a storage unit configured to store therein a reference value of reception intervals of the messages. If a reception interval of successive messages, in a sequence of the messages to which the identification information of the same value is added and which are received in the detection device, is shorter than the reference value, the detection unit determines that an unauthorized message is present.

An in-vehicle device according to the present disclosure is an in-vehicle device configured to transmit, in an in-vehicle network, messages to which identification information is added. The messages include a periodic message and an event message. The in-vehicle device includes: a creation unit configured to create the periodic message and the event message; and a transmission control unit configured to transmit the periodic message and the event message created by the creation unit. In successively transmitting event messages to which the identification information of the same value is added, if a cumulative value of a transmission interval between an event message and a previously transmitted message matches a transmission cycle of the periodic message or is within a range obtained by adding a predetermined margin value to the transmission cycle, the transmission control unit delays a transmission timing of an event message to be currently transmitted so that the cumulative value exceeds the range.

A detection device according to the present disclosure is a detection device used in an in-vehicle network in which messages to which identification information is added are transmitted. The messages include a periodic message and an event message. The detection device includes: a monitoring unit configured to monitor the messages; a detection unit configured to detect presence of an unauthorized message in the in-vehicle network, based on a monitoring result of the monitoring unit; and a storage unit configured to store therein a transmission cycle of the periodic message. If a cumulative value of a reception interval between a message that is currently received in the detection device and a message that has been previously received in the detection device, these messages being given the identification information of the same value, matches the transmission cycle stored in the storage unit or is within a range obtained by adding a predetermined margin value to the transmission cycle, the detection unit determines that an unauthorized message is present.

A transmission control method according to the present disclosure is a transmission control method in an in-vehicle device. The method includes: creating a periodic message and an event message to which identification information is added, as messages to be transmitted in an in-vehicle network; and transmitting the created periodic message and event message. In transmitting the event message, after a waiting time elapses from a transmission timing of a previously transmitted message among the messages to which the identification information of the same value as that of the event message to be transmitted is added, the event message to which the identification information of the same value is added is transmitted. The waiting time is longer than half a transmission cycle of the periodic message and is shorter than the transmission cycle.

A detection method according to the present disclosure is a detection method in a detection device used in an in-vehicle network in which messages to which identification information is added are transmitted. The message includes a periodic message and an event message. The method includes: monitoring the messages, and detecting presence of an unauthorized message in the in-vehicle network, based on a monitoring result. The detection device stores therein a reference value of reception intervals of the messages. In detecting presence of an unauthorized message, if a reception interval of successive messages, in a sequence of the messages to which the identification information of the same value is added and which are received in the detection device, is shorter than the reference value, it is determined that an unauthorized message is present.

A transmission control method according to the present disclosure is a transmission control method in an in-vehicle device, and includes: creating a periodic message and an event message to which identification information is added, as messages to be transmitted in an in-vehicle network; and transmitting the created periodic message and event message. In successively transmitting event messages to which the identification information of the same value is added, if a cumulative value of a transmission interval between an event message and a previously transmitted message matches a transmission cycle of the periodic message or is within a range obtained by adding a predetermined margin value to the transmission cycle, a transmission timing of an event message to be currently transmitted is delayed so that the cumulative value exceeds the range.

A detection method according to the present disclosure is a detection method in a detection device used in an in-vehicle network in which messages to which identification information is added are transmitted. The messages include a periodic message and an event message. The method includes: monitoring the messages, and detecting presence of an unauthorized message in the in-vehicle network, based on a monitoring result. The detection device stores therein a transmission cycle of the periodic message. In detecting presence of an unauthorized message, if a cumulative value of a reception interval between a message that is currently received in the detection device and a message that has been previously received in the detection device, these messages being given the identification information of the same value, matches the stored transmission cycle or is within a range obtained by adding a predetermined margin value to the transmission cycle, it is determined that an unauthorized message is present.

One mode of the present disclosure can be realized not only as an in-vehicle device including such a characteristic processing unit but also as a program for causing a computer to perform such characteristic processing. One mode of the present disclosure can be realized as a semiconductor integrated circuit that realizes a part or the entirety of the in-vehicle device, or as an in-vehicle communication system including the in-vehicle device.

One mode of the present disclosure can be realized not only as a detection device including such a characteristic processing unit but also as a program for causing a computer to perform such characteristic processing. One mode of the present disclosure can be realized as a semiconductor integrated circuit that realizes a part or the entirety of the detection device, or as an in-vehicle communication system including the detection device.

DETAILED DESCRIPTION

Figure 1:
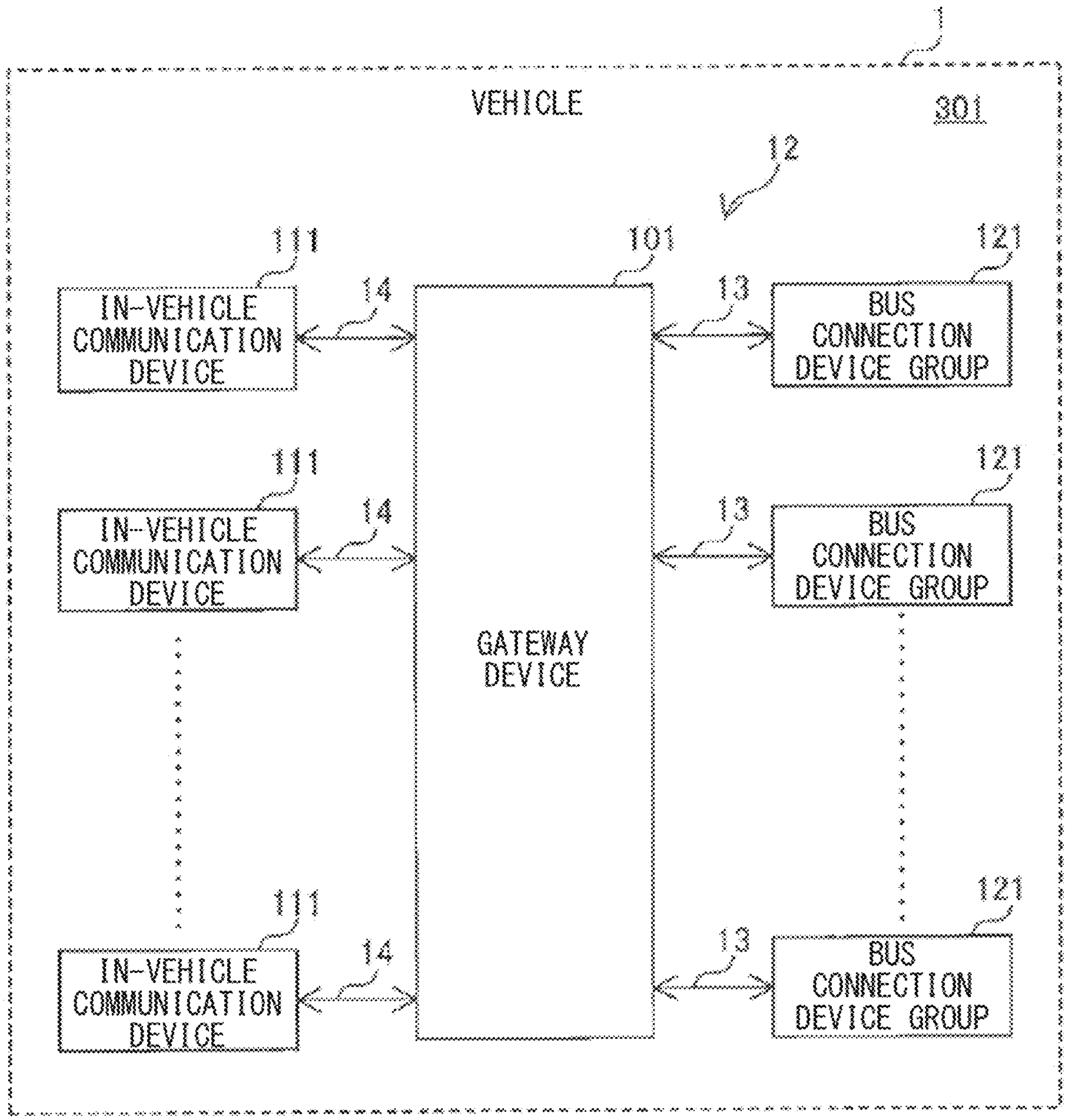
FIG. 1 shows a configuration of an in-vehicle communication system according to an embodiment of the present disclosure.

Conventionally, technologies for enhancing security in an in-vehicle network have been developed.

Problems to be Solved by the Present Disclosure

In the network device described in PATENT LITERATURE 1, if normal data being non-periodically transmitted is received between a certain reception timing and a next reception timing of periodic data, the non-periodically transmitted normal data may be erroneously detected as unauthorized data.

In the fraud detection method described in PATENT LITERATURE 2, since a counter value is set inside a data field of the event-driven data being non-periodically transmitted, a storage area for other information to be stored in the data field may become insufficient.

The present disclosure is made to solve the above problems, and an object of the present disclosure is to provide an in-vehicle device, a detection device, a transmission control method, and a detection method capable of more accurately detecting presence of an unauthorized message in an in-vehicle network while preventing reduction in use efficiency of communication resources, in the in-vehicle network where a periodic message and an event message coexist.

Effects of the Present Disclosure

According to the present disclosure, in an in-vehicle network where a periodic message and an event message coexist, it is possible to more accurately detect presence of an unauthorized message in the in-vehicle network while preventing reduction in use efficiency of communication resources.

Description of Embodiment of the Present Disclosure

First, contents of embodiments of the present disclosure are listed and described.

(1) An in-vehicle device according to an embodiment of the present disclosure is an in-vehicle device configured to transmit, in an in-vehicle network, messages to which identification information is added. The messages include a periodic message and an event message. The in-vehicle device includes: a creation unit configured to create the periodic message and the event message; and a transmission control unit configured to transmit the periodic message and the event message created by the creation unit. In transmitting the event message, after a waiting time elapses from a transmission timing of a previously transmitted message among the messages to which the identification information of the same value as that of the event message to be transmitted is added, the transmission control unit transmits the event message to which the identification information of the same value is added. The waiting time is longer than half a transmission cycle of the periodic message and is shorter than the transmission cycle.

In the above configuration, for example, on the message reception side, if the reception interval of messages to which the same identification information is added is shorter than the waiting time, presence of an unauthorized message can be easily determined.

In addition, the waiting time is set to be longer than half the transmission cycle of the periodic message and shorter than the transmission cycle. Therefore, in various cases of receiving unauthorized messages on the reception side, such as an unauthorized message received between a periodic message and a next periodic message, and an unauthorized message received between a periodic message and an event message, since the reception interval of the messages is shorter than the waiting time, it is possible to more reliably detect presence of the unauthorized message.

Therefore, in the in-vehicle network where the periodic message and the event message coexist, presence of an unauthorized message in the in-vehicle network can be more accurately detected while preventing reduction in use efficiency of communication resources.

(2) A detection device according to the embodiment of the present disclosure is a detection device used in an in-vehicle network in which messages to which identification information is added are transmitted. The messages include a periodic message and an event message. The detection device includes: a monitoring unit configured to monitor the messages; a detection unit configured to detect presence of an unauthorized message in the in-vehicle network, based on a monitoring result of the monitoring unit; and a storage unit configured to store therein a reference value of reception intervals of the messages. If a reception interval of successive messages, in a sequence of the messages to which the identification information of the same value is added and which are received in the detection device, is shorter than the reference value, the detection unit determines that an unauthorized message is present.

In the above configuration, for example, in transmitting an event message on the message transmission side, the event message is transmitted after a time at which a time of the same length as the reference value has elapsed from a transmission timing of a previously transmitted message to which the same identification information is added. Therefore, by comparing the message reception interval with the reference value in the detection device, presence of an unauthorized message can be accurately and easily detected.

Therefore, in the in-vehicle network where the periodic message and the event message coexist, presence of an unauthorized message in the in-vehicle network can be more accurately detected while preventing reduction in use efficiency of communication resources.

(3) An in-vehicle device according to the embodiment of the present disclosure is an in-vehicle device configured to transmit, in an in-vehicle network, messages to which identification information is added. The messages include a periodic message and an event message. The in-vehicle device includes: a creation unit configured to create the periodic message and the event message; and a transmission control unit configured to transmit the periodic message and the event message created by the creation unit. In successively transmitting event messages to which the identification information of the same value is added, if a cumulative value of a transmission interval between an event message and a previously transmitted message matches a transmission cycle of the periodic message or is within a range obtained by adding a predetermined margin value to the transmission cycle, the transmission control unit delays a transmission timing of an event message to be currently transmitted so that the cumulative value exceeds the range.

In the above configuration, on the message reception side, for example, as for a plurality of messages to which the same identification information is added, it is confirmed whether or not a reception interval cumulative value for each message satisfies a predetermined condition, whereby presence of an unauthorized message can be easily detected.

In addition, on the reception side, for example, not only when the reception interval cumulative value matches the transmission cycle of the periodic message but also when it is within the range obtained by adding the predetermined margin value to the transmission cycle, it is determined that an unauthorized message is present. Therefore, a more accurate detection result in consideration of a message propagation delay time or the like can be obtained.

Therefore, in the in-vehicle network where the periodic message and the event message coexist, presence of an unauthorized message in the in-vehicle network can be more accurately detected while preventing reduction in use efficiency of communication resources.

In addition, by avoiding the state where the transmission interval cumulative value satisfies the predetermined condition, an event message can be transmitted early without a waiting time provided before transmission of the event message.

(4) As for a plurality of messages to which the identification information of the same value is added, the transmission control unit may create a list of transmission interval values of the messages or a history of cumulative values of transmission intervals of the messages. In successively transmitting the event messages to which the identification information of the same value is added, the transmission control unit, based on the created list or history, may confirm whether or not a cumulative value of a transmission interval between the event message to be currently transmitted and the previously transmitted message matches the transmission cycle or is within the range obtained by adding the predetermined margin value to the transmission cycle.

In the above configuration, it is possible to easily acquire the transmission interval cumulative value by referring to the created list of the transmission interval values or the created history of the transmission interval cumulative values.

(5) A detection device according to the embodiment of the present disclosure is a detection device used in an in-vehicle network in which messages to which identification information is added are transmitted. The messages include a periodic message and an event message. The detection device includes: a monitoring unit configured to monitor the messages; a detection unit configured to detect presence of an unauthorized message in the in-vehicle network, based on a monitoring result of the monitoring unit; and a storage unit configured to store therein a transmission cycle of the periodic message. If a cumulative value of a reception interval between a message that is currently received in the detection device and a message that has previously been received in the detection device, these messages being given the identification information of the same value, matches the transmission cycle stored in the storage unit or is within a range obtained by adding a predetermined margin value to the transmission cycle, the detection unit determines that an unauthorized message is present.

In the above configuration, as for the plurality of messages to which the same identification information is added, by confirming the reception interval cumulative value for each message, presence of an unauthorized message can be accurately and easily detected.

In addition, not only when the reception interval cumulative value matches the transmission cycle of the periodic message but also when it is within the range obtained adding the predetermined margin value to the transmission cycle, it is determined that an unauthorized message is present. Therefore, a more accurate detection result in consideration of a message propagation delay time or the like can be obtained.

Therefore, in the in-vehicle network where the periodic message and the event message coexist, presence of an unauthorized message in the in-vehicle network can be more accurately detected while preventing reduction in use efficiency of communication resources.

In the above configuration, on the event message transmission side, by avoiding the state where the transmission interval cumulative value satisfies the predetermined condition, an event message can be transmitted early without a waiting time provided before transmission of the event message.

(6) As for a plurality of messages to which the identification information of the same value is added, the detection unit may create a list of reception interval values of the messages or a history of cumulative values of reception intervals of the messages, and may confirm, based on the created list or history, whether or not a cumulative value of a reception interval between the currently received message and the previously received message, these messages being given the identification information of the same value, matches the transmission cycle or is within the range obtained by adding the predetermined margin value to the transmission cycle.

In the above configuration, it is possible to easily acquire the reception interval cumulative value by referring to the created list of the reception interval values or the created history of the reception interval cumulative values.

(7) A transmission control method according to the embodiment of the present disclosure is a transmission control method in an in-vehicle device. The method includes: creating a periodic message and an event message to which identification information is added, as messages to be transmitted in an in-vehicle network; and transmitting the created periodic message and event message. In transmitting the event message, after a waiting time elapses from a transmission timing of a previously transmitted message among the messages to which the identification information of the same value as that of the event message to be transmitted is added, the event message to which the identification information of the same value is added is transmitted. The waiting time is longer than half a transmission cycle of the periodic message and is shorter than the transmission cycle.

In the above method, for example, on the message reception side, if the reception interval of messages to which the same identification information is added is shorter than the waiting time, presence of an unauthorized message can be easily determined.

In addition, the waiting time is set to be longer than half the transmission cycle of the periodic message and shorter than the transmission cycle. Therefore, in various cases of receiving unauthorized messages on the reception side, such as an unauthorized message received between a periodic message and a next periodic message, and an unauthorized message received between a periodic message and an event message, since the reception interval of the messages is shorter than the waiting time, it is possible to more reliably detect presence of the unauthorized message.

Therefore, in the in-vehicle network where the periodic message and the event message coexist, presence of an unauthorized message in the in-vehicle network can be more accurately detected while preventing reduction in use efficiency of communication resources.

(8) A detection method according to the embodiment of the present disclosure is a detection method in a detection device used in an in-vehicle network in which messages to which identification information is added are transmitted. The message includes a periodic message and an event message. The method includes: monitoring the messages; and detecting presence of an unauthorized message in the in-vehicle network, based on a monitoring result. The detection device stores therein a reference value of reception intervals of the messages. In detecting presence of an unauthorized message, if a reception interval of successive messages. In a sequence of the messages to which the identification information of the same value is added and which are received in the detection device, is shorter than the reference value, it is determined that an unauthorized message is present.

In the above method, for example, in transmitting an event message on the message transmission side, the event message is transmitted after a time at which a time of the same length as the reference value has elapsed from a transmission timing of a previously transmitted message to which the same identification information is added. Therefore, by comparing the message reception interval with the reference value in the detection device, presence of an unauthorized message can be accurately and easily detected.

Therefore, in the in-vehicle network where the periodic message and the event message coexist, presence of an unauthorized message in the in-vehicle network can be more accurately detected while preventing reduction in use efficiency of communication resources.

(9) A transmission control method according to the embodiment of the present disclosure is a transmission control method in an in-vehicle device, and includes: creating a periodic message and an event message to which identification information is added, as messages to be transmitted in an in-vehicle network; and transmitting the created periodic message and event message. In successively transmitting event messages to which the identification information of the same value is added, if a cumulative value of a transmission interval between an event message and a previously transmitted message matches a transmission cycle of the periodic message or is within a range obtained by adding a predetermined margin value to the transmission cycle, a transmission timing of an event message to be currently transmitted is delayed so that the cumulative value exceeds the range.

In the above method, on the message reception side, for example, as for a plurality of messages to which the same identification information is added, it is confirmed whether or not a reception interval cumulative value for each message satisfies a predetermined condition, whereby presence of an unauthorized message can be easily detected.

In addition, on the reception side, not only when the reception interval cumulative value matches the transmission cycle of the periodic message but also when it is within the range obtained adding the predetermined margin value to the transmission cycle, it is determined that an unauthorized message is present. Therefore, a more accurate detection result in consideration of a message propagation delay time or the like can be obtained.

Therefore, in the in-vehicle network where the periodic message and the event message coexist, presence of an unauthorized message in the in-vehicle network can be more accurately detected while preventing reduction in use efficiency of communication resources.

In addition, by avoiding the state where the transmission interval cumulative value satisfies the predetermined condition, an event message can be transmitted early without a waiting time provided before transmission of the event message.

(10) A detection method according to the embodiment of the present disclosure is a detection method in a detection device used in an in-vehicle network in which messages to which identification information is added are transmitted. The messages include a periodic message and an event message. The method includes: monitoring the messages; and detecting presence of an unauthorized message in the in-vehicle network, based on a monitoring result. The detection device stores therein a transmission cycle of the periodic message. In detecting presence of an unauthorized message, if a cumulative value of a reception interval between a message that is currently received in the detection device and a message that has been previously received in the detection device, these messages being given the identification information of the same value, matches the stored transmission cycle or is within a range obtained by adding a predetermined margin value to the transmission cycle, it is determined that an unauthorized message is present.

In the above method, as for the plurality of messages to which the same identification information is added, by confirming the reception interval cumulative value for each message, presence of an unauthorized message can be accurately and easily detected.

In addition, not only when the reception interval cumulative value matches the transmission cycle of the periodic message but also when it is within the range obtained by adding the predetermined margin value to the transmission cycle, it is determined that an unauthorized message is present. Therefore, a more accurate detection result in consideration of a message propagation delay time or the like can be obtained.

Therefore, in the in-vehicle network where the periodic message and the event message coexist, presence of an unauthorized message in the in-vehicle network can be more accurately detected while preventing reduction in use efficiency of communication resources.

In the above method, on the event message transmission side, by avoiding the state where the transmission interval cumulative value satisfies the predetermined condition, an event message can be transmitted early without a waiting time provided before transmission of the event message.

Hereinafter, an embodiment of the present disclosure will be described with reference to the accompanying drawings. In the drawings, the same or corresponding parts are denoted by the same reference signs, and the descriptions thereof are not repeated. At least some parts of the embodiment described below may be combined together as desired.

<Configuration and Basic Operation>

FIG. 1 shows a configuration of an in-vehicle communication system according to an embodiment of the present disclosure.

With reference to FIG. 1, an in-vehicle communication system 301 mounted in a vehicle 1 includes a gateway device 101, a plurality of in-vehicle communication devices 111, and a plurality of bus connection device groups 121. The gateway device 101 is an example of a detection device. The gateway device 101 is connected to each bus connection device group 121 via a bus 13, and is connected to each in-vehicle communication device 111 via a bus 14. The gateway device 101, the plurality of in-vehicle communication devices 111, and the plurality of bus connection device groups 121, which are connected via the buses 13, 14, constitute an in-vehicle network 12.

Figure 2:
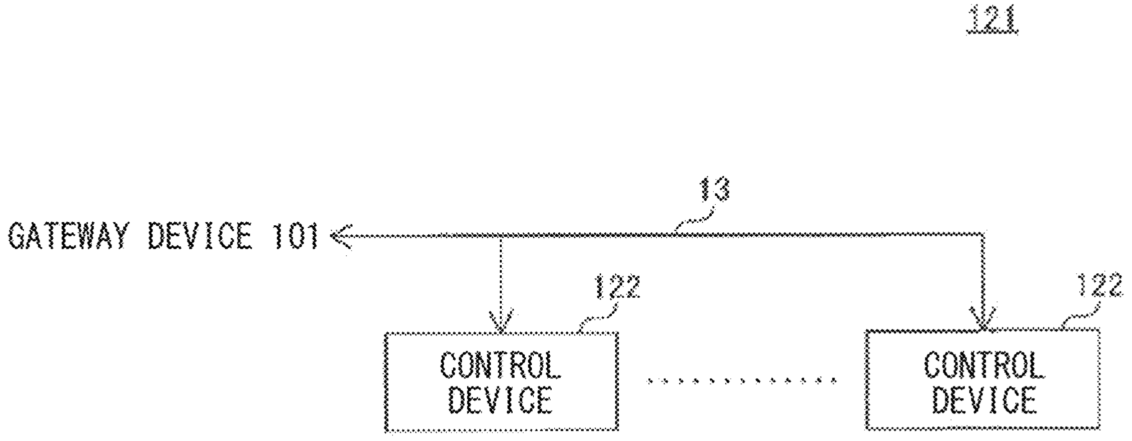
FIG. 2 shows a configuration of a bus connection device group according to the embodiment of the present disclosure.

FIG. 2 shows a configuration of a bus connection device group according to the embodiment of the present disclosure.

With reference to FIG. 2, the bus connection device group 121 includes a plurality of control devices 122. The bus connection device group 121 may not necessarily include a plurality of control devices 122, and may include one control device 122.

Referring back to FIG. 1, the in-vehicle communication system 301 includes a plurality of in-vehicle devices that are devices present inside the vehicle 1. Specifically, the in-vehicle communication system 301 includes a plurality of in-vehicle communication devices **11*l* and a plurality of control devices 122 which are examples of in-vehicle devices. As long as the in-vehicle communication system 301 is configured to include a plurality of in-vehicle devices, the in-vehicle communication system 301 may include a plurality of in-vehicle communication devices 111 while including no control device 122, may include a plurality of control devices 122 while including no in-vehicle communication device 111, or may include one in-vehicle communication device 111 and one control device 122**.

In the in-vehicle communication system 301, the in-vehicle communication devices 111 communicate with devices outside the vehicle 1, for example. Specifically, the in-vehicle communication devices 111 are a TCU (Telematics Communication Unit), a short-range wireless terminal device, and an ITS (Intelligent Transport Systems) wireless device, for example.

The gateway device 101 is connected to the in-vehicle devices via buses 13, 14. Specifically, each of the buses 13, 14 is a bus according to, for example, a standard of CAN (Controller Area Network) (registered trademark), FlexRay (registered trademark), MOST (Media Oriented Systems Transport) (registered trademark), Ethernet (registered trademark), LIN (Local Interconnect Network), or the like.

In this example, each in-vehicle communication device 111 is connected to the gateway device 101 via a corresponding bus 14 according to the Ethernet standard. Meanwhile, each control device 122 in each bus connection device group 121 is connected to the gateway device 101 via a corresponding bus 13 according to the CAN standard.

The gateway device 101 is, for example, a central gateway (CGW), and can communicate with the in-vehicle devices.

The gateway device 101 performs a relay process of relaying information transmitted/received between the control devices 122 connected to different buses 13 in the vehicle 1, information transmitted/received between the in-vehicle communication devices 111, and information transmitted/received between a control device 122 and an in-vehicle communication device 111, for example.

More specifically, in the vehicle 1, as for messages in the in-vehicle communication system 301, for example, a periodic message and an event message are transmitted from a certain in-vehicle device to another in-vehicle device, according to a predetermined rule such as a communication protocol. That is, messages being transmitted in the in-vehicle communication system 301 include periodic messages and event messages. A periodic message is a message transmitted from a certain in-vehicle device to another in-vehicle device after a predetermined time CT from a transmission timing of a previous message. The event message is a message non-periodically transmitted from a certain in-vehicle device to another in-vehicle device.

In this example, messages transmitted from a certain control device 122 to another control device 122 via a bus 13 and the gateway device 101 are described. However, the same applies to messages transmitted between a control device 122 and an in-vehicle communication device 111, and messages between in-vehicle communication devices 111.

[Control Device]

Figure 3:
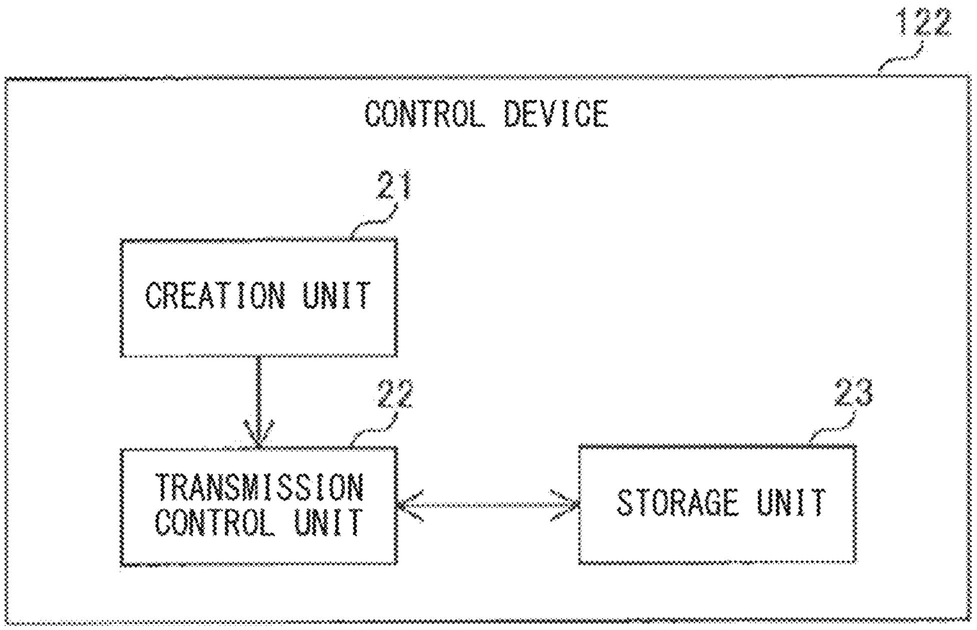
FIG. 3 shows a configuration of a control device in the in-vehicle communication system according to the embodiment of the present disclosure.

FIG. 3 shows a configuration of a control device in the in-vehicle communication system according to the embodiment of the present disclosure.

With reference to FIG. 3, the control device 122 includes a creation unit 21, a transmission control unit 22, and a storage unit 23. The creation unit 21 and the transmission control unit 22 are realized by a processor such as a CPU (Central Processing Unit) or a DSP (Digital Signal Processor), for example. The storage unit 23 is a nonvolatile memory, for example.

The creation unit 21 can create a periodic message and an event message to another in-vehicle device. More specifically, for example, the creation unit 21 sets a count value of a timer to a predetermined value T1 corresponding to a transmission cycle of a periodic message, at a time when the control device 122 has transmitted a previous message. After the count value has been set to the predetermined value T1, the timer starts periodic decrement of the count value. The creation unit 21 creates a periodic message in response to the count value of the timer having expired, that is, the count value having become zero, and outputs the periodic message to the transmission control unit 22. Moreover, for example, when an event message is required to be transmitted, the creation unit 21 creates the event message before expiration of the count value of the timer regardless of the count value, and outputs the event message to the transmission control unit 22.

Then, the creation unit 21 adds a message ID (Identifier) as an example of identification information to the created periodic message or event message, and outputs the message to the transmission control unit 22. The message ID indicates a control device 122 as a message transmission source, for example. The creation unit 21 may add different message IDs to a plurality of messages to be transmitted from the same control device 122.

Upon receiving the periodic message or the event message created by the creation unit 21, the transmission control unit 22 transmits the periodic message or the event message to the gateway device 101.

More specifically, when the transmission control unit 22 has transmitted the periodic message or the event message, the transmission control unit 22 stores the transmission timing in the storage unit 23. When newly transmitting an event message, the transmission control unit 22 controls the transmission timing of the event message to be newly transmitted, based on the transmission timing of the previously transmitted message to which the same message ID is added. Control of the transmission timing of the event message by the transmission control unit 22 will be described later in detail.

[Configuration of Gateway Device]

Figure 4:
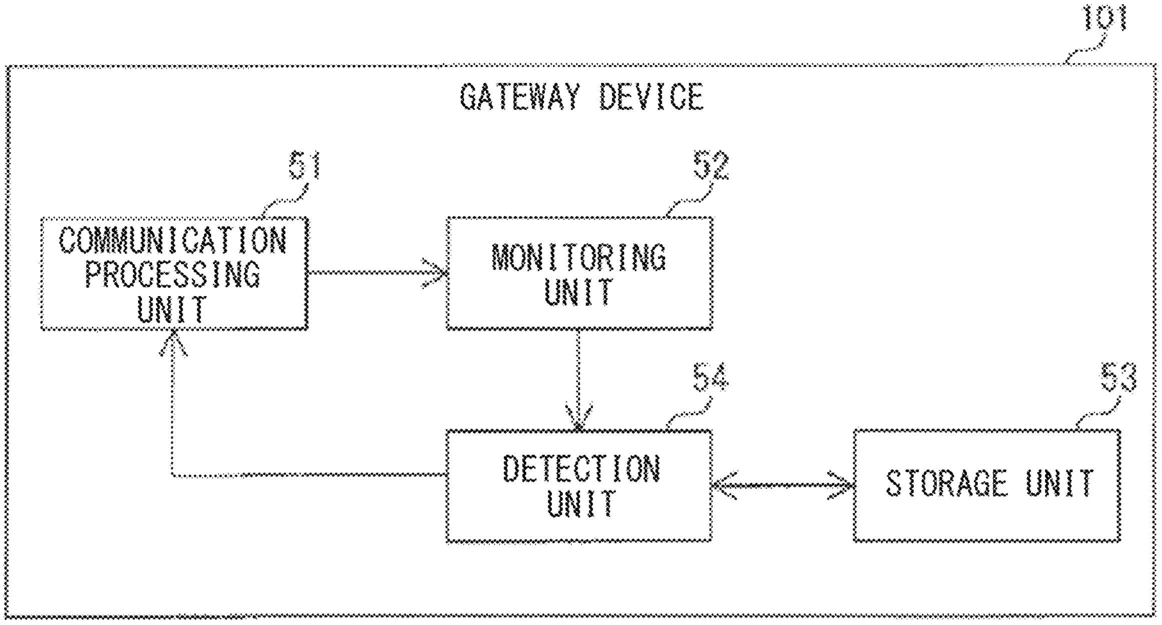
FIG. 4 shows a configuration of a gateway device in the in-vehicle communication system according to the embodiment of the present disclosure.

FIG. 4 shows a configuration of the gateway device in the in-vehicle communication system according to the embodiment of the present disclosure.

With reference to FIG. 4, the gateway device 101 includes a communication processing unit 51, a monitoring unit 52, a storage unit 53, and a detection unit 54. The communication processing unit 51, the monitoring unit 52, and the detection unit 54 are realized by a processor such as a CPU or a DSP, for example. The storage unit 53 is a nonvolatile memory, for example.

The gateway device 101 detects presence of an unauthorized message in the in-vehicle network 12, in addition to relaying information transmitted/received between the in-vehicle devices.

More specifically, the communication processing unit 51 performs a relay process of receiving a message on the bus 13 or 14 in the in-vehicle network 12, and transmitting the received message to another in-vehicle device. In addition, upon receiving the message, the communication processing unit 51 outputs a reception notification to the monitoring unit 52.

The monitoring unit 52 monitors a periodic message and an event message which are messages being transmitted in the in-vehicle network 12 and to which message IDs such as transmission source identification information are added.

For example, upon receiving the reception notification from the communication processing unit 51, the monitoring unit 52 acquires the message ID included in the message received by the communication processing unit 51. Then, the monitoring unit 52 outputs a monitoring result indicating the current time and the message ID, to the detection unit 54.

Upon receiving the monitoring result outputted from the monitoring unit 52, the detection unit 54 detects presence of an unauthorized message in the in-vehicle network 12, based on the monitoring result. The detection by the detection unit 54 will be described later in detail.

[Detection Method 1]

(Control of Event Message Transmission Timing)

Figure 5:
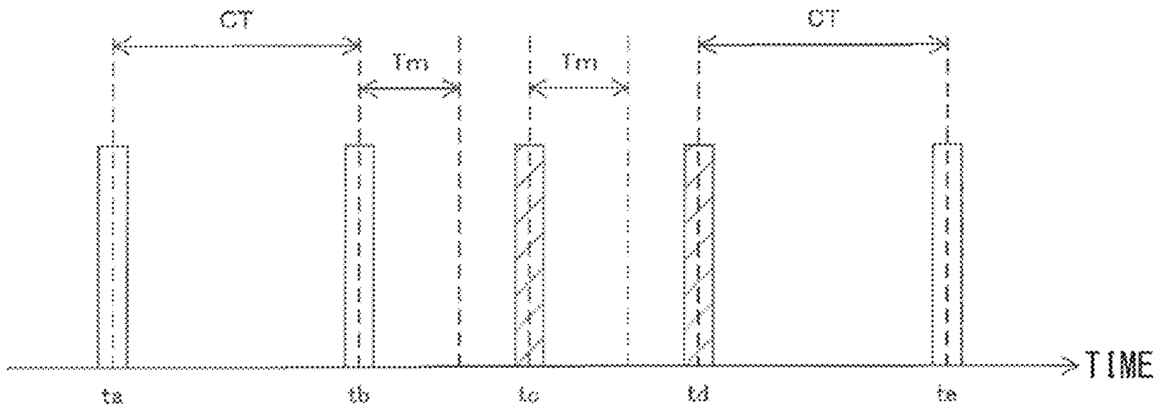
FIG. 5 illustrates control for a transmission timing of an event message by a transmission control unit in the control device according to the embodiment of the present disclosure.

FIG. 5 illustrates control of an event message transmission timing by a transmission control unit in a control device according to the embodiment of the present disclosure.

With reference to FIG. 3 and FIG. 5, upon receiving the event message created by the creation unit 21, the transmission control unit 22 in the control device 122 calculates, as a transmission interval, a time period from the transmission timing to the current time, with reference to the transmission timing, stored in the storage unit 23, of the previously transmitted message to which the same message ID is added.

After a waiting time Tm has elapsed from the transmission timing of the previously transmitted message, the transmission control unit 22 transmits the event message received from the creation unit 21 to the gateway device 101. That is, if the calculated transmission interval is shorter than the waiting time Tm, the transmission control unit 22 holds transmission of the event message, and delays the transmission timing. If the calculated transmission interval is equal to or longer than the waiting time Tm, the transmission control unit 22 transmits the event message to the gateway device 101 without holding the same.

The waiting time Tm is set to a length that is longer than half the predetermined time CT corresponding to the transmission interval of the periodic message, and is shorter than the predetermined time CT. That is, $(CT/2<Tm<CT)$ is satisfied.

Specifically, as shown in FIG. 5, the control device 122 transmits, at time ta and time tb, periodic messages to which the same message ID is added, and thereafter, transmits an event message to which the message ID is added. In this case, for example, the control device 122 transmits the event message at time tc after a time at which the waiting time Tm has elapsed from time tb.

After transmission of the event message at time tc, the control device 122 again transmits an event message to which the message ID is added. In this case, for example, the control device 122 transmits the event message at time td after a time at which the waiting time Tm has elapsed from time tc.

After transmission of the event message at time td, the control device 122 transmits a periodic message to which the message ID is added. In this case, the control device 122 transmits the periodic message at time te that is a time at which the predetermined time CT has elapsed from time td.

(Detection of Presence of Unauthorized Message)

Referring back to FIG. 4, the above-described waiting time Tm, which is a reference value of a message reception interval, is stored in the storage unit 53 in the gateway device 101.

Upon receiving the monitoring result from the monitoring unit 52, the detection unit 54 stores the time and the message ID, indicated by the monitoring result, in association with each other in the storage unit 53.

Upon newly receiving a monitoring result from the monitoring unit 52, the detection unit 54 confirms whether or not the same message ID as the message ID indicated by the monitoring result is stored in the storage unit 53. If the message ID is stored in the storage unit 53, the detection unit 54 acquires the latest time from among one or a plurality of times corresponding to the message ID stored in the storage unit 53.

Then, based on the acquired time and the time indicated by the newly received monitoring result, the detection unit 54 calculates a reception interval of messages that are given the same message ID and are temporally successively received by the gateway device 101.

If the calculated reception interval is shorter than the waiting time Tm stored in the storage unit 53, the detection unit 54 determines that an unauthorized message is present in the in-vehicle network 12. If the reception interval is equal to or longer than the waiting time Tm, the detection unit 54 determines that an unauthorized message is unlikely to be present in the in-vehicle network 12.

(a) Specific Example 1

Figure 6:
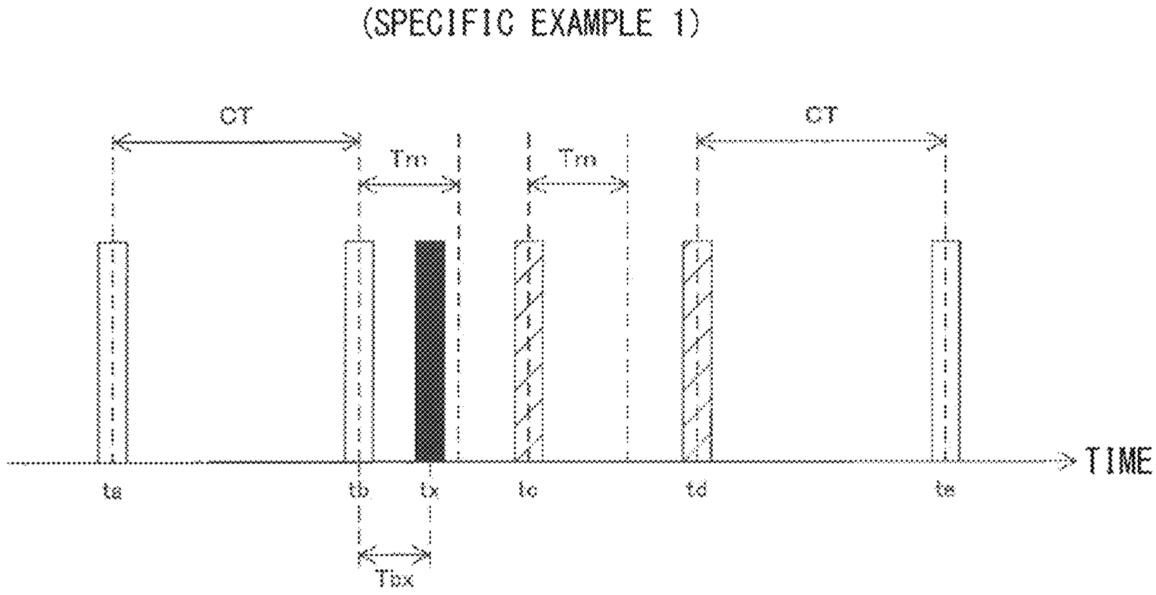
FIG. 6 illustrates an example of detection by a detection unit in the gateway device according to the embodiment of the present disclosure.

FIG. 6 illustrates an example of detection by the detection unit in the gateway device according to the embodiment of the present disclosure.

With reference to FIG. 5 and FIG. 6, for example, it is assumed that, as in the case shown in FIG. 5, the control device 122 transmits, at time ta and time tb, periodic messages to which the same message ID is added, transmits, at time tc and time td, event messages to which the message ID is added, and transmits, at time te, a periodic message to which the message ID is added. In addition, it is assumed that, as shown in FIG. 6, an unauthorized message to which the message ID is added is transmitted to the gateway device 101 at time tx that is a time before elapse of the waiting time Tm from time tb.

The detection unit 54 in the gateway device 101 calculates a reception interval of successive messages in a sequence of the messages to which the same message ID is added. In the example of FIG. 6, a reception interval Tbx between the message transmitted at time tb and the message transmitted at time tx is shorter than the waiting time Tm. That is, (Tbx<Tm) is satisfied. Therefore, the detection unit 54 determines that an unauthorized message is present in the in-vehicle network 12.

(b) Specific Example 2

Figure 7:
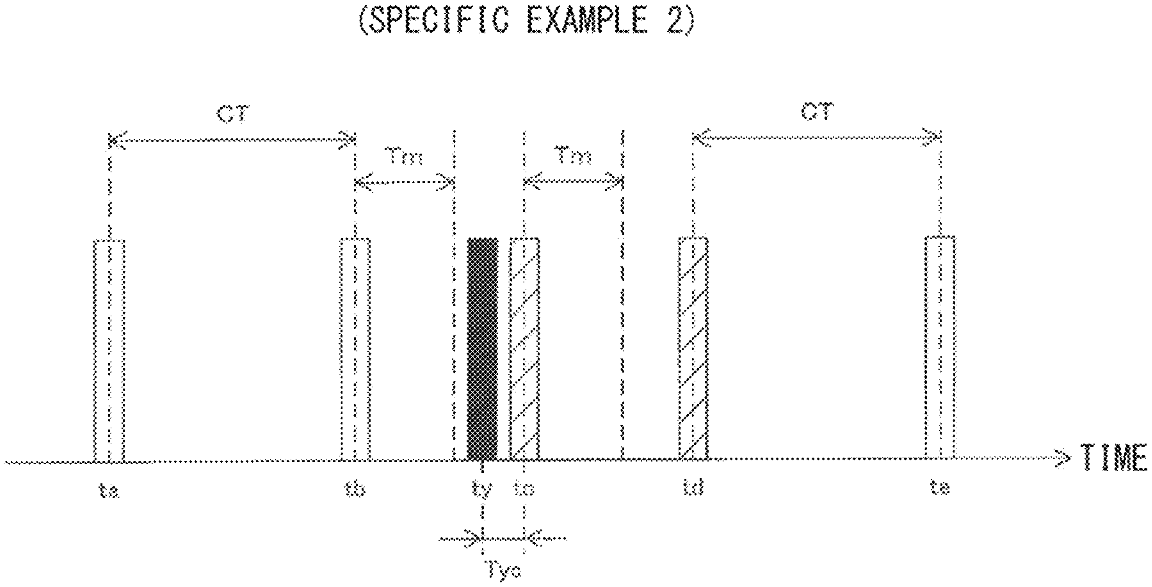
FIG. 7 illustrates an example of detection by the detection unit in the gateway device according to the embodiment of the present disclosure.

FIG. 7 illustrates an example of detection by the detection unit in the gateway device according to the embodiment of the present disclosure.

With reference to FIG. 5 and FIG. 7, for example, it is assumed that, as in the case of FIG. 5, the control device 122 transmits, at time ta and time tb, periodic messages to which the same message ID is added, transmits, at time tc and time td, event messages to which the message ID is added, and transmits, at time te, a periodic message to which the message ID is added. In addition, it is assumed that, as shown in FIG. 7, an unauthorized message to which the message ID is added is transmitted to the gateway device 101 at time ty that is after a time at which the waiting time Tm has elapsed from time tb, and before time tc.

The detection unit 54 in the gateway device 101 calculates a reception interval of successive messages in a sequence of the messages to which the same message ID is added. In the case of FIG. 7, a reception interval Tyc between the message transmitted at time ty and the message transmitted at time tc is shorter than the waiting time Tm (Tyc<Tm). Therefore, the detection unit 54 determines that an unauthorized message is present in the in-vehicle network 12.

(c) Specific Example 3

Figure 8:
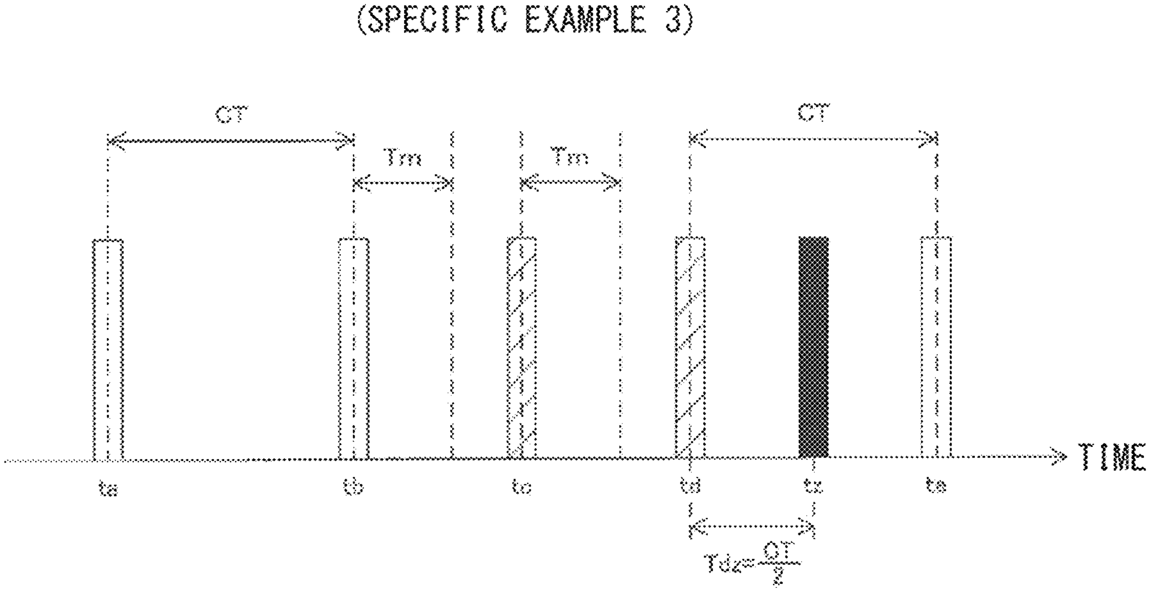
FIG. 8 illustrates an example of detection by the detection unit in the gateway device according to the embodiment of the present disclosure.

FIG. 8 illustrates an example of detection by the detection unit in the gateway device according to the embodiment of the present disclosure.

With reference to FIG. 5 and FIG. 8, for example, it is assumed that, as in the case of FIG. 5, the control device 122 transmits, at time ta and time tb, periodic messages to which the same message ID is added, transmits, at time tc and time td, event messages to which the message ID is added, and transmits, at time te, a periodic message to which the message ID is added. In addition, it is assumed that, as shown in FIG. 8, an unauthorized message to which the message ID is added is transmitted to the gateway device 101 at time tz that is a time at which half the predetermined time CT has elapsed from time td.

The detection unit 54 in the gateway device 101 calculates a reception interval of successive messages in a sequence of the messages to which the same message ID is added. In the case of FIG. 8, a reception interval Tdz (=CT/2) between the message transmitted at time td and the message transmitted at time tz is shorter than the waiting time Tm (Tdz<Tm). Therefore, the detection unit 54 determines that an unauthorized message is present in the in-vehicle network 12.

[Detection Method 2]

(Control of Event Message Transmission Timing)

Figure 9:
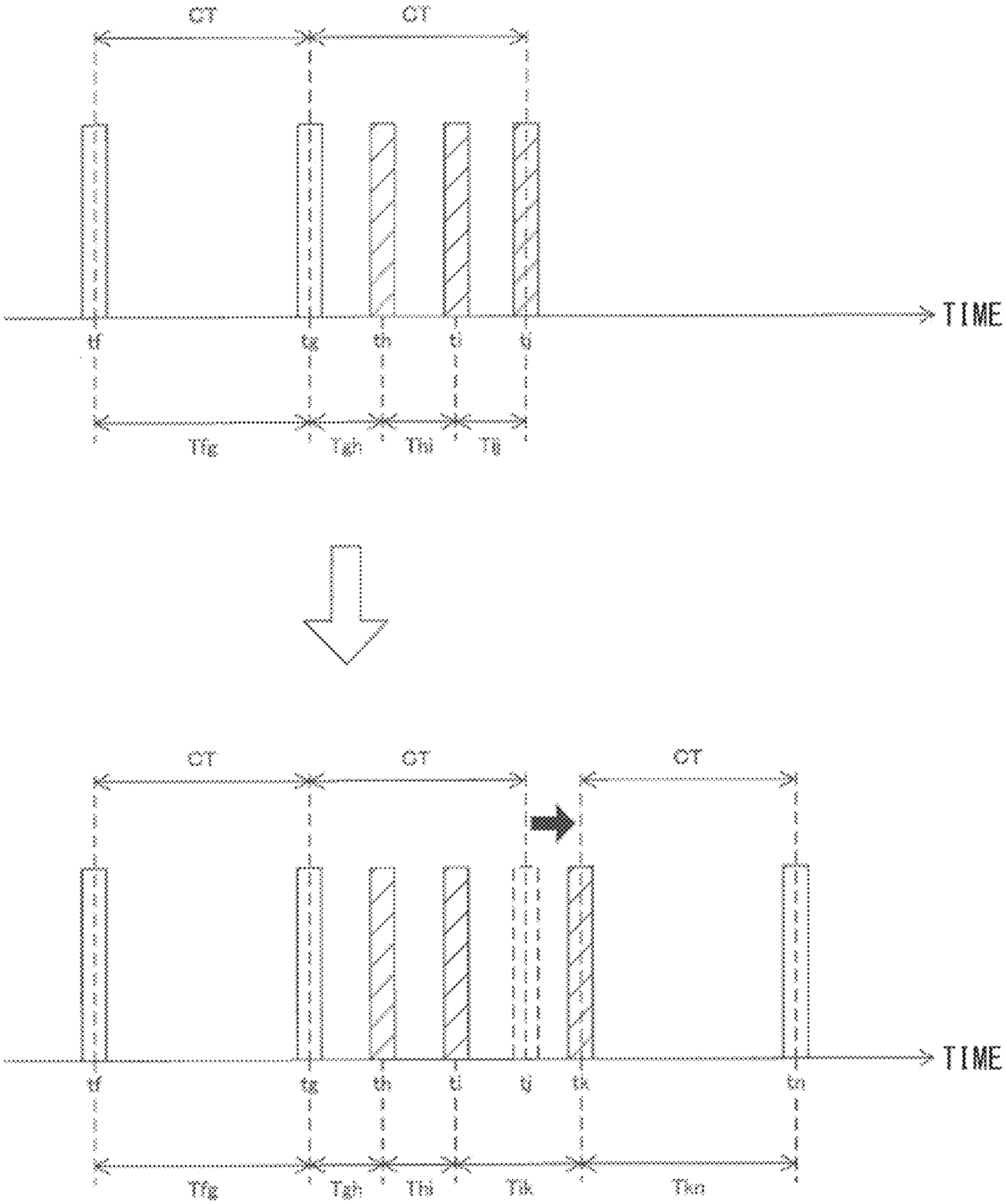
FIG. 9 illustrates control for a transmission timing of an event message by the transmission control unit in the control device according to the embodiment of the present disclosure.

FIG. 9 illustrates control of an event message transmission timing by the transmission control unit in the control device according to the embodiment of the present disclosure.

With reference to FIG. 3 and FIG. 9, the storage unit 23 has, stored therein, the predetermined time CT that is the transmission cycle of the periodic message, and a predetermined margin value $\alpha$.

When successively transmitting event messages to which the same message ID is added, the transmission control unit 22 confirms a cumulative value S1 of a transmission interval between an event message and a previously transmitted message. If the cumulative value S1 matches the predetermined time CT or is within a range obtained by adding the predetermined margin value $\alpha$ to the predetermined time CT, i.e., if $(CT-\alpha)<S1<(CT+\alpha)$ is satisfied, the transmission control unit 22 delays a transmission timing of an event message to be currently transmitted so that the cumulative value S1 exceeds the range.

For example, as shown in an upper part of FIG. 9, it is assumed that the control device 122 transmits periodic messages at time tf and time tg, and transmits event messages at time th, time ti, and time tj. Time Tfg from time tf to time tg corresponds to the predetermined time CT A total time of time Tgh from time tg to time th, time Thi from time th to time ti, and time Tij from time ti to time tj, i.e., a time from time tg to time tj, corresponds to the predetermined time CT.

In this case, since the transmission interval cumulative value S1 corresponds to the predetermined time CT, the transmission control unit 22 delays a transmission timing of an event message that was planned to be transmitted at time tj. For example, the transmission control unit 22 transmits the event message at time tk that is later than time tj, as shown in a lower part of FIG. 9.

As for a plurality of messages to which the same message ID is added, the transmission control unit 22 creates a list of transmission interval values of the messages or a history of cumulative values S1 of transmission intervals of the messages, and stores the list or the history in the storage unit 23. When transmitting an event message, the transmission control unit 22 can confirm whether or not the cumulative value S1 satisfies the relational expression of (CT−α)<S1<(CT+α) by referring to the created list or history.

It is assumed that, based on the created list or history, the transmission control unit 22 confirms that the transmission interval cumulative value S1 exceeds the predetermined time CT or the value obtained by adding the predetermined margin value α to the predetermined time CT. In this case, the transmission control unit 22 deletes one or a plurality of transmission interval values from the list or deletes one or a plurality of cumulative values S1 from the history, preferentially from the oldest one, so that the cumulative value S1 does not exceed the predetermined time CT+α. Here, the transmission control unit 22 creates a history of cumulative values S1 of transmission interval of messages.

The transmission control unit 22 may not necessarily be configured to delete a value from the list or the history. For example, the transmission control unit 22 may realize the list or the history by a ring buffer, and when having newly transmitted a message, may preferentially overwrite the oldest value included in the list or the history with a new value.

FIG. 10 to FIG. 13 illustrate an example of a history of transmission interval cumulative values, created by the transmission control unit in the control device according to the embodiment of the present disclosure.

With reference to FIG. 9 to FIG. 13, it is assumed that, as shown in the lower part of FIG. 9, the transmission control unit 22 transmits periodic messages at time tf and time tg, transmits event messages at time th, time ti, and time tk, and further transmits a periodic message at time tn at which the predetermined time CT has elapsed from time tk.

Figure 10:
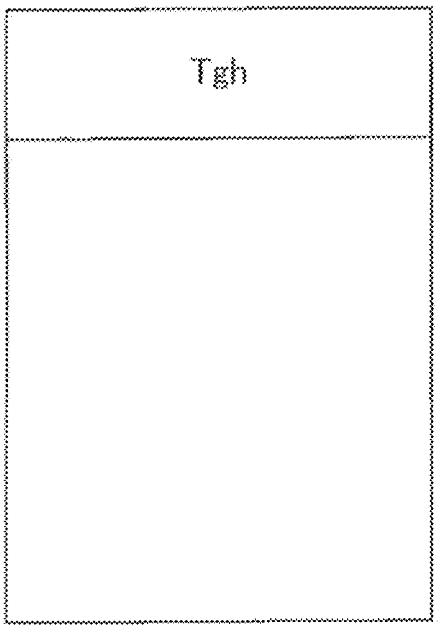
FIG. 10 illustrates an example of a history of transmission interval cumulative values that is created by the transmission control unit in the control device according to the embodiment of the present disclosure.

For example, the storage unit 23 has, stored therein, a table for creating a history of transmission interval cumulative values S1. When transmitting the event message at time th, the transmission control unit 22 registers, in the table, time Tgh that is a transmission interval between the event message and the previous message, as shown in FIG. 10.

Figure 11:
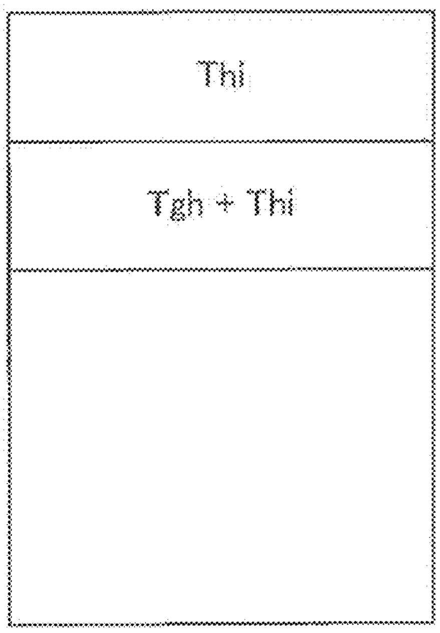
FIG. 11 illustrates an example of the history of transmission interval cumulative values that is created by the transmission control unit in the control device according to the embodiment of the present disclosure.

When transmitting the event message at time ti, the transmission control unit 22 registers, in the table, time Thi that is a transmission interval between the event message and the previous message, and adds the time Thi to the already-registered time Tgh, as shown in FIG. 11.

Figure 12:
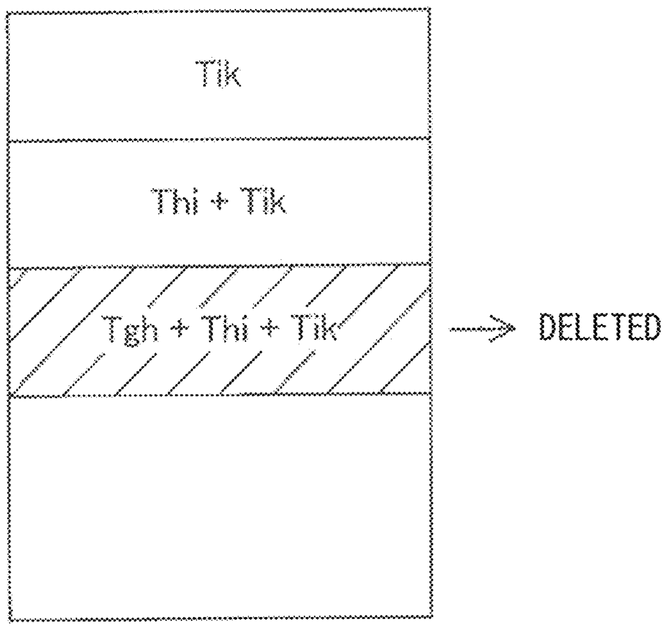
FIG. 12 illustrates an example of the history of transmission interval cumulative values that is created by the transmission control unit in the control device according to the embodiment of the present disclosure.

When transmitting the event message at time tk, the transmission control unit 22 registers, in the table, time Tik that is a transmission interval between the event message and the previous message, and adds the time Tik to each of the already-registered time Thi and time Tgh+Thi, as shown in FIG. 12.

Among the cumulative values S1 registered in the table, time Tgh+Thi+Tik after the addition of the time Tik exceeds the predetermined time CT. Therefore, the transmission control unit 22 deletes the time Tgh+Thi+Tik, which is the oldest cumulative value S1, from the table so that the cumulative value S1 does not exceed the predetermined time CT+α.

Figure 13:
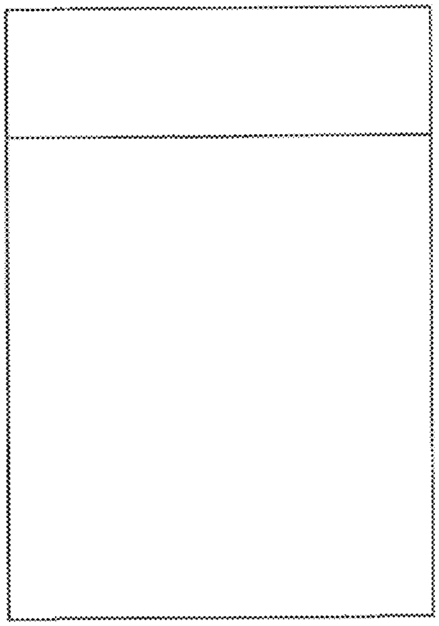
FIG. 13 illustrates an example of the history of transmission interval cumulative values that is created by the transmission control unit in the control device according to the embodiment of the present disclosure.

When transmitting the periodic message at time tn, the transmission control unit 22 resets the cumulative values S1 registered in the table, as shown in FIG. 13. That is, the transmission control unit 22 deletes all the cumulative values registered in the table.

In the case where the transmission control unit 22 creates a list of transmission interval values instead of the history of transmission interval cumulative values S1, when successively transmitting event messages to which the same message ID is added, the transmission control unit 22 calculates a total of transmission interval values that are elements registered in the created list, thereby acquiring a transmission interval cumulative value S1 for each message.

As for a plurality of messages to which the same ID is added, the transmission control unit 22 only needs to be configured to acquire a transmission interval cumulative value S1 for each message, and may adopt a method other than creation of a list of transmission interval cumulative values of the messages or a history of transmission interval cumulative values S1 of the messages.

It is assumed that the transmission control unit 22 is configured to create a list or a history that is realized by a ring buffer the number of buffers of which is appropriately designed, and is configured to, when newly transmitting a message, preferentially overwrite the oldest value included in the list or the history with a new value. In this case, when the transmission control unit 22 overwrites the oldest value with the new value in the state where the transmission interval cumulative value S1 does not exceed the predetermined time CT+α, the transmission control unit 22 may determine, for example, that an abnormality such as many unauthorized messages being transmitted per unit time, and may transmit the determination result to the gateway device 101. In this case, upon receiving the determination result indicating the abnormality from the control device 122, the gateway device 101 transmits the determination result to a higher-order device inside or outside the vehicle 1, for example.

(Detection of Presence of Unauthorized Message)

Referring back to FIG. 4, the storage unit 53 in the gateway device 101 has, stored therein, the above-described predetermined time CT and a predetermined margin value β.

When the gateway device 101 has received a new message and the detection unit 54 has received a monitoring result from the monitoring unit 52, the detection unit 54 calculates a reception interval between the currently received message and the previously received message to which the same message ID as that of the currently received message is added, as in the above-described detection method 1.

For example, if the calculated reception interval is shorter than a length (CT−β) obtained by subtracting the margin value β from the predetermined time CT, the detection unit 54 confirms a cumulative value S2 of the reception interval between the currently received message and the message which has been previously received in the gateway device 101 and to which the same message ID as that of the currently received message is added. If the cumulative value S2 matches the predetermined time CT or is within a range obtained by adding the predetermined margin value β to the predetermined time CT, i.e., if (CT−β)<S2<(CT+β) is satisfied, the detection unit 54 determines that an unauthorized message is present in the in-vehicle network 12.

The detection unit 54, for example, creates a list of reception interval values of messages or a history of reception interval cumulative values S2, for each of message IDs of the in-vehicle devices in the in-vehicle network 12. If the calculated reception interval is shorter than the length (CT−β) obtained by subtracting the margin value β from the predetermined time CT, the detection unit 54 can confirm whether or not the cumulative value S2 satisfies the relational expression of (CT−β)<S2<(CT+β) by referring to the created list or history.

It is assumed that the detection unit 54, based on the created list or history, confirms that the reception interval cumulative value S2 exceeds the predetermined time CT or a value obtained by adding the predetermined margin value β to the predetermined time CT. In this case, the detection unit 54 deletes one or a plurality of reception interval values from the list or deletes one or a plurality of cumulative values S2 from the history, preferentially from the oldest one, so that the cumulative value S2 does not exceed the predetermined time CT+β. Here, the detection unit 54 creates a history of reception interval cumulative values S2 of messages.

The detection unit 54 may not necessarily be configured to delete a value from the list or the history. For example, the detection unit 54 may realize the list or the history by a ring buffer, and when having newly received a message, may preferentially overwrite the oldest value included in the list or the history with a new value.

Figure 14:
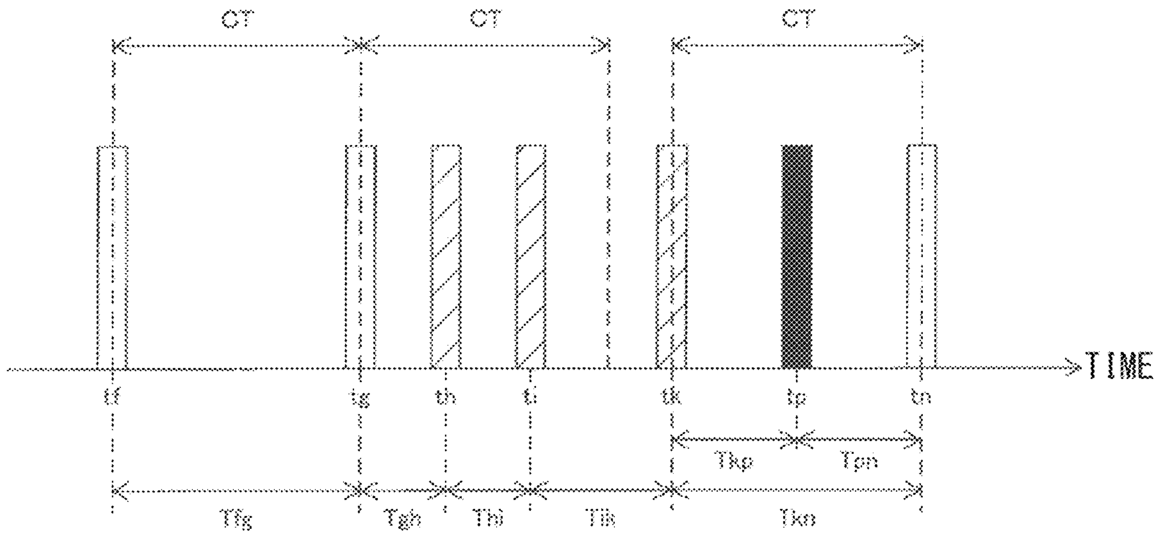
FIG. 14 illustrates an example of detection by the detection unit in the gateway device according to the embodiment of the present disclosure.
Figure 15:
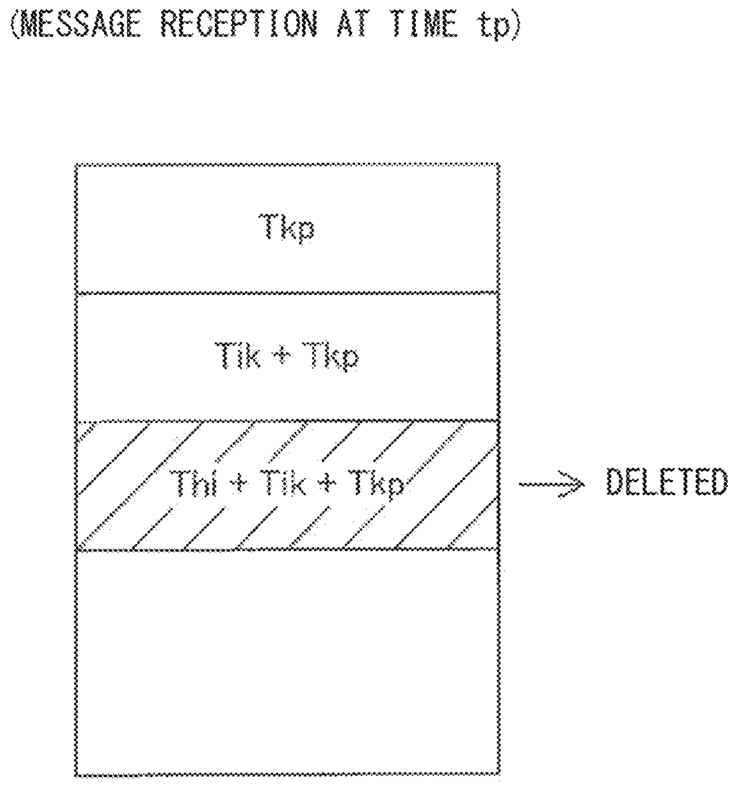
FIG. 15 illustrates an example of a history of reception interval cumulative values that is created by the detection unit in the gateway device according to the embodiment of the present disclosure.
Figure 16:
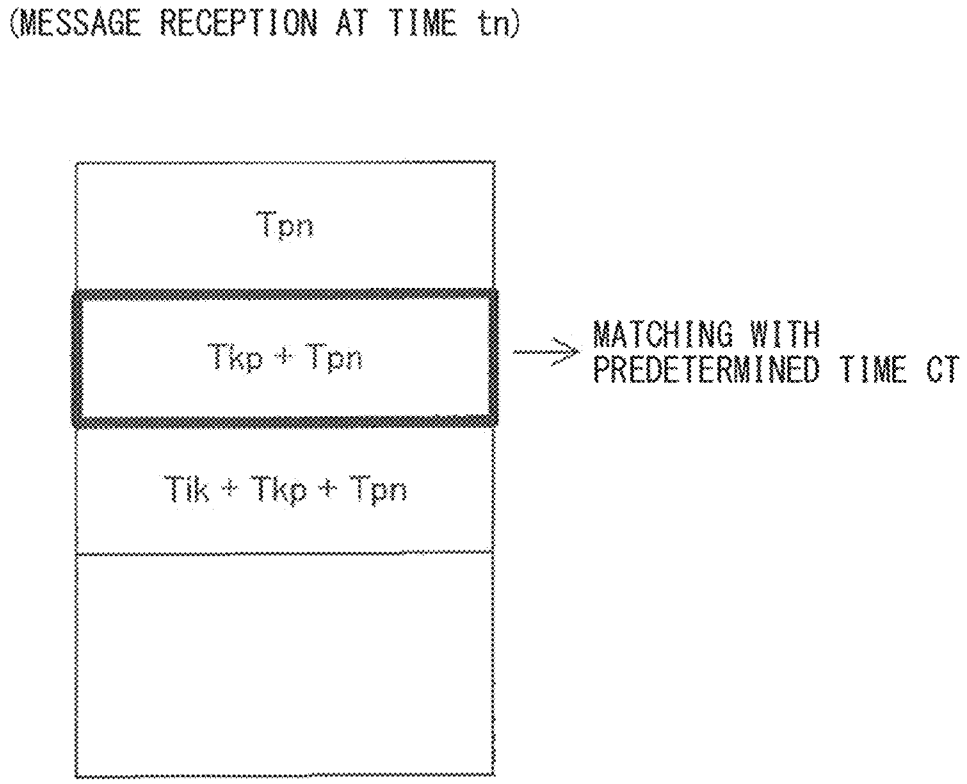
FIG. 16 illustrates an example of the history of reception interval cumulative values that is created by the detection unit in the gateway device according to the embodiment of the present disclosure.

FIG. 14 illustrates an example of detection by the detection unit in the gateway device according to the embodiment of the present disclosure. FIG. 15 and FIG. 16 each illustrate an example of a history of reception interval cumulative values, created by the detection unit in the gateway device according to the embodiment of the present disclosure.

With reference to FIG. 9 and FIG. 14 to FIG. 16, for example, it is assumed that the control device 122 transmits, at time tf and time tg, periodic messages to which the same message ID is added, transmits, at time th, time ti, and time tk, event messages to which the message ID is added, and transmits, at time tn, a periodic message to which the message ID is added, as in the case shown in the lower part of FIG. 9. In addition, as shown in FIG. 14, it is assumed that an unauthorized message to which the message ID is added is transmitted to the gateway device 101 at time tp between time tk and time tn.

The storage unit 53 in the gateway device 101 has, stored therein, a table for creating a list of reception interval values of messages or a history of reception interval cumulative values S2, for each of message IDs of the in-vehicle devices in the in-vehicle network 12, for example.

The detection unit 54 calculates a reception interval of successive messages in a sequence of the messages to which the same message ID is added, and registers a cumulative value S2 of the calculated reception interval in a corresponding table. The history of the reception interval cumulative values S2 which is created by the detection unit 54 is similar to the history of the transmission interval cumulative values S1 shown in FIG. 10 to FIG. 12 which is created by the transmission control unit 22 in the control device 122. Therefore, here, the table shown in FIG. 10 to FIG. 12 is used for description.

Specifically, upon receiving a message transmitted at time th, the detection unit 54 registers, in the table, time Tgh that is a reception interval between the received message and the previous message having the same message ID as the received message, as in the case of the table shown in FIG. 10.

Upon receiving a message transmitted at time ti, the detection unit 54 registers, in the table, time Thi that is a reception interval between the received message and the previous message having the same message ID as the received message, and adds the time Thi to the already-registered time Tgh, as in the case of the table shown in FIG. 11.

Upon receiving a message transmitted at time tk, the detection unit 54 registers, in the table, time Tik that is a reception interval between the received message and the previous message having the same message ID as the received message, and adds the time Tik to each of the already-registered time Thi and time Tgh+Thi, as in the case of the table shown in FIG. 12.

Among the cumulative values S2 registered in the table, the time Tgh+Thi+Tik after the addition of the time Tik exceeds the predetermined time CT. Therefore, the detection unit 54 deletes the time Tgh+Tbi+Tik, which is the oldest cumulative value S2, from the table so that the cumulative value S2 does not exceed the predetermined time CT+β.

Upon receiving a message transmitted at time tp, as shown in FIG. 15, the detection unit 54 registers, in the table, time Tkp that is a reception interval between the received message and the previous message having the same message ID as the received message, and adds the time Tkp to each of the already-registered time Tik and time Thi+Tik.

Among the cumulative values S2 registered in the table, time Thi+Tik+Tkp after the addition of time Tkp exceeds the predetermined time CT. Therefore, the detection unit 54 deletes the time Thi+Tik+Tkp, which is the oldest cumulative value S2, from the table so that the cumulative value S2 does not exceed the predetermined time CT+β.

Upon receiving a message transmitted at time tn, as shown in FIG. 16, the detection unit 54 registers, in the table, time Tpn that is a reception interval between the received message and the previous message having the same message ID as the received message, and adds the time Tpn to each of the already-registered time Tkp and time Tik+Tkp.

At this time, among the cumulative values S2 registered in the table, time Tkp+Tpn after the addition of the time Tpn matches the predetermined time CT, and satisfies the relational expression of (CT−β)<S2<(CT+β). Therefore, the detection unit 54 determines that an unauthorized message is present in the in-vehicle network 12.

In the case where the detection unit 54 creates a list of reception interval values instead of the history of reception interval cumulative values S2, when receiving a message, the detection unit 54 calculates a total of reception interval values that are elements registered in the created list, thereby acquiring a reception interval cumulative value S2 for each message.

As for a plurality of messages to which the same ID is added, the detection unit 54 only needs to be configured to acquire a reception interval cumulative value S2 for each message, and may adopt a method other than creation of a list of reception interval values of the messages or a history of reception interval cumulative values S2 of the messages.

The control device 122 and the gateway device 101 may be configured to perform both the detection method 1 and the detection method 2 described above, or one of the detection method 1 and the detection method 2.

That is, the control device 122 has a first function of, when transmitting an event message, transmitting the event message after the waiting time Tm has elapsed from the transmission timing of the previously transmitted message to which the same message ID is added, as in the above-described detection method 1. In this case, the gateway device 101 has a function of determining that an unauthorized message is present, if the reception interval of successively received messages to which the same message ID is added is shorter than the waiting time Tm, as in the above-described detection method 1.

Furthermore, as in the above-described detection method 2, when successively transmitting event messages to which the same message ID is added, the control device 122 has a second function of delaying the transmission timing of the event message, if the cumulative value S1 of transmission intervals of the messages satisfies the relational expression of (CT−α)<S1<(CT+α). In this case, as in the above-described detection method 2, the gateway device 101 has a function of determining that an unauthorized message is present, if a cumulative value S2 of reception intervals of successive messages, in a sequence of messages to which the same message ID is added, satisfies the relational expression of $(CT-\beta)<S2<(CT+\beta)$.

The control device 122 may have both the first function and the second function, or may have one of the first function and the second function. For example, in the case where the control device 122 has both the first function and the second function, if transmission of an event message without the waiting time Tm is required, the control device 122 adopts the detection method 2 and transmits the event message before half the predetermined time CT elapses from the transmission timing of the previous message.

[Output of Detection Result]

Upon detecting presence of an unauthorized message, the detection unit 54 outputs, to the communication processing unit 51, a detection result indicating that presence of the unauthorized message has been detected.

Upon receiving the detection result from the detection unit 54, the communication processing unit 51 transmits warning information indicating presence of the unauthorized message to the higher-order device inside or outside the vehicle 1.

<Operation Flow>

Each device in the in-vehicle communication system according to the embodiment of the present disclosure includes a computer that includes a memory. An arithmetic processing unit such as a CPU in the computer reads out, from the memory, a program including a part or all of steps in the flow chart and sequence shown below, and executes the program. Programs for the plurality of devices can each be installed from outside. The programs for the plurality of devices are each distributed in a state of being stored in a storage medium, or via a communication line.

[Detection Method 1]

(Operation of Control Device)

(a) Transmission of Periodic Message

Figure 17:
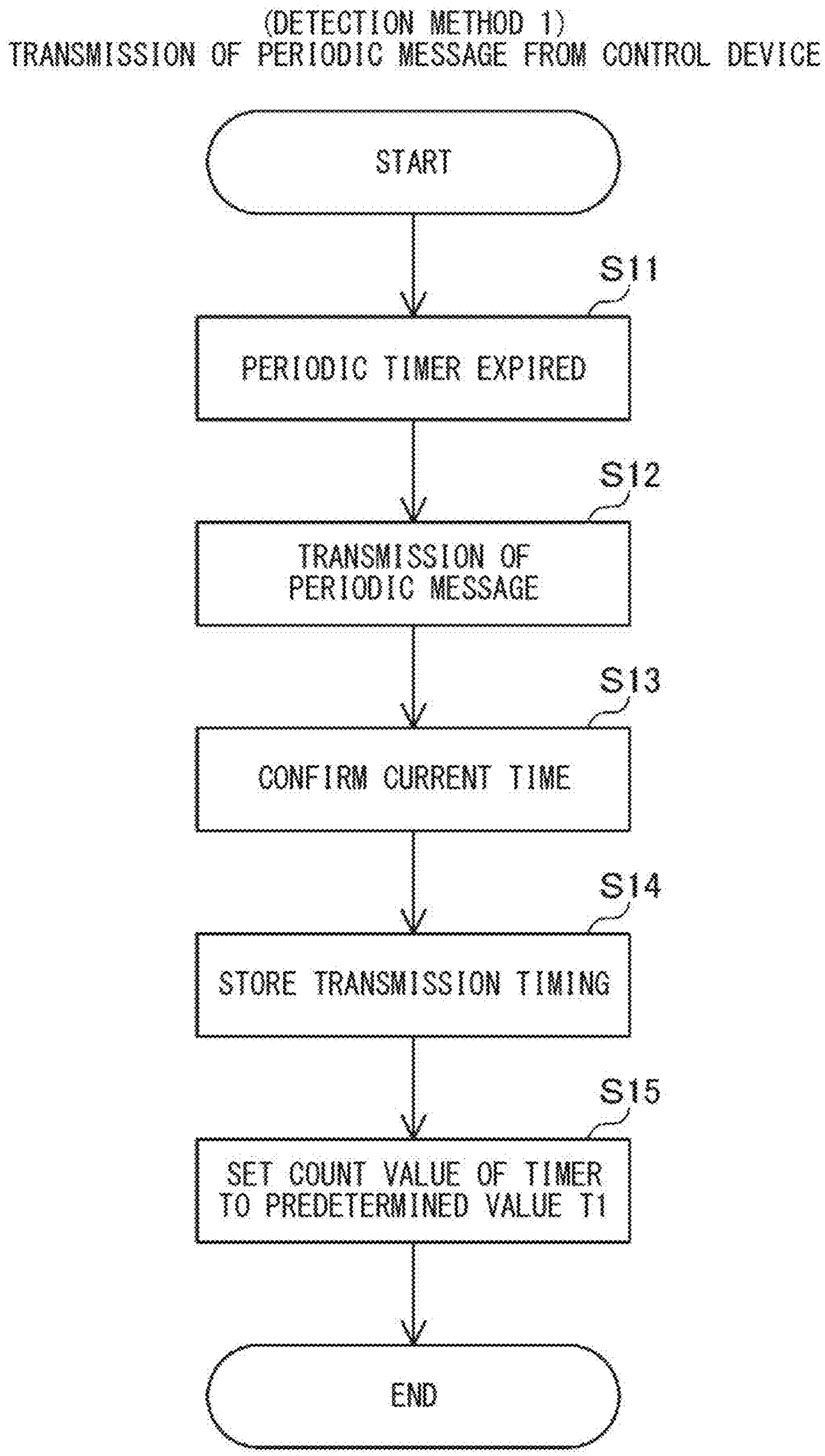
FIG. 17 is a flowchart showing an example of an operation procedure when the control device transmits a periodic message to the gateway device, according to the embodiment of the present disclosure.

FIG. 17 is a flowchart showing an example of an operation procedure when the control device transmits a periodic message to the gateway device, according to the embodiment of the present disclosure.

With reference to FIG. 17, when the count value of the timer has expired (step S11), first, the creation unit 21 creates a periodic message and outputs the periodic message to the transmission control unit 22. The transmission control unit 22 transmits the periodic message received from the creation unit 21, to the gateway device 101 (step S12).

Next, the transmission control unit 22 confirms the current time (step S13), and stores the current time in the storage unit 23 as a periodic message transmission timing (step S14). Then, the transmission control unit 22 sets the count value of the timer to the predetermined value T1 (step S15).

(b) Transmission of Event Message

Figure 18:
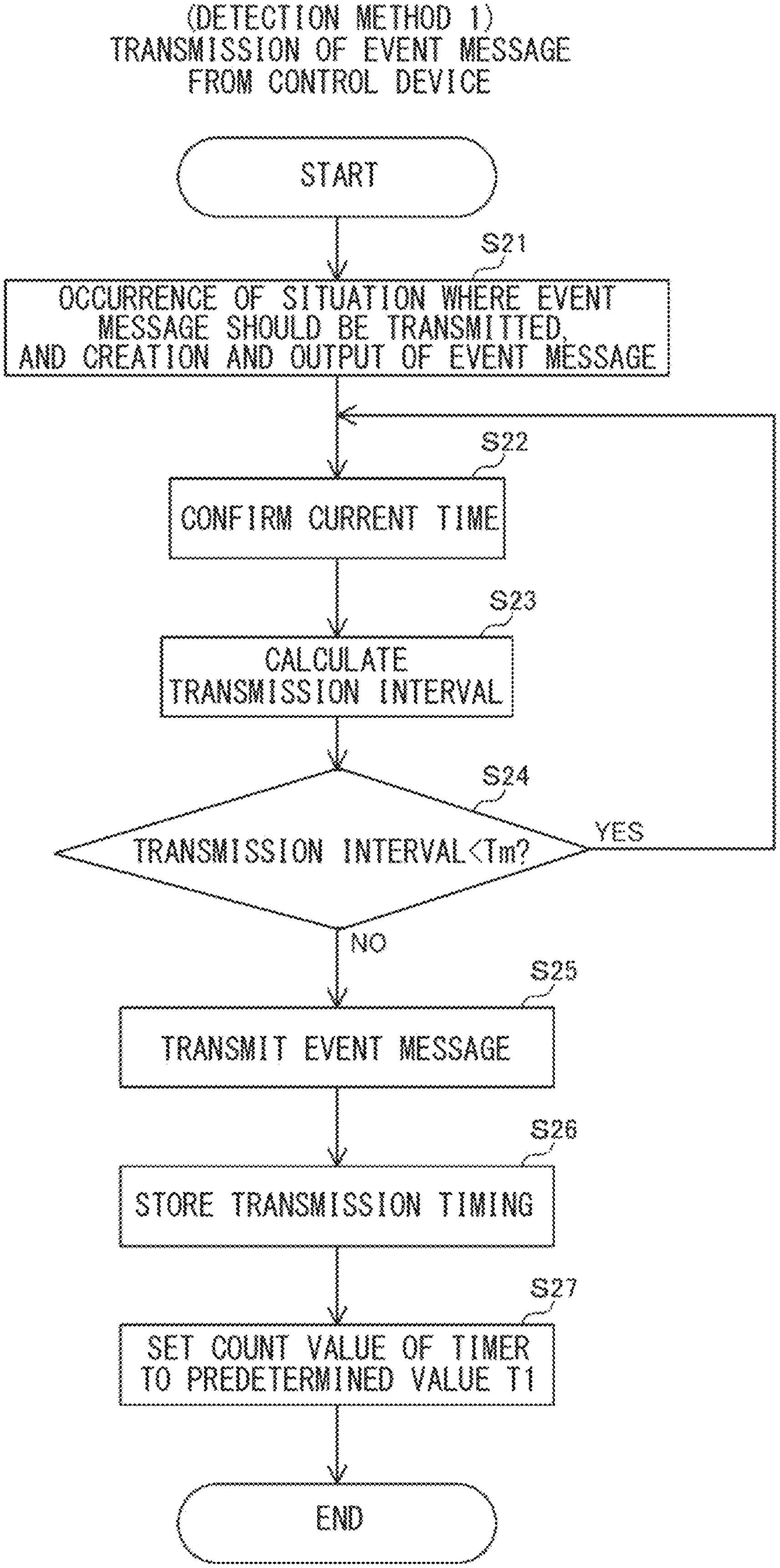
FIG. 18 is a flowchart showing an example of an operation procedure when the control device transmits an event message to the gateway device, according to the embodiment of the present disclosure.

FIG. 18 is a flowchart showing an example of an operation procedure when the control device transmits an event message to the gateway device, according to the embodiment of the present disclosure.

With reference to FIG. 18, when a situation in which an event message should be transmitted has occurred, first, the creation unit 21 creates an event message to be transmitted, and outputs the event message to the transmission control unit 22 (step S21).

Next, upon receiving the event message from the creation unit 21, the transmission control unit 22 confirms the current time (step S22), and calculates, as a transmission interval, a difference between the current time and a transmission timing of a previously transmitted message to which the same message ID is added (step S23).

Next, the transmission control unit 22 confirms whether or not the calculated transmission interval is shorter than the waiting time Tm (step S24).

Next, when the calculated transmission interval is shorter than the waiting time Tm ("YES" in step S24), the transmission control unit 22 holds transmission of the event message, and performs the operation in and after step S22 again.

Meanwhile, when the calculated transmission interval is equal to or longer than the waiting time Tm ("NO" in step S24), the transmission control unit 22 transmits the event message to the gateway device 101 (step S25).

Next, the transmission control unit 22 stores, in the storage unit 23, the current time as an event message transmission timing (step S26). Then, the transmission control unit 22 sets the count value of the timer to the predetermined value T1 (step S27).

(Operation of Gateway Device)

Figure 19:
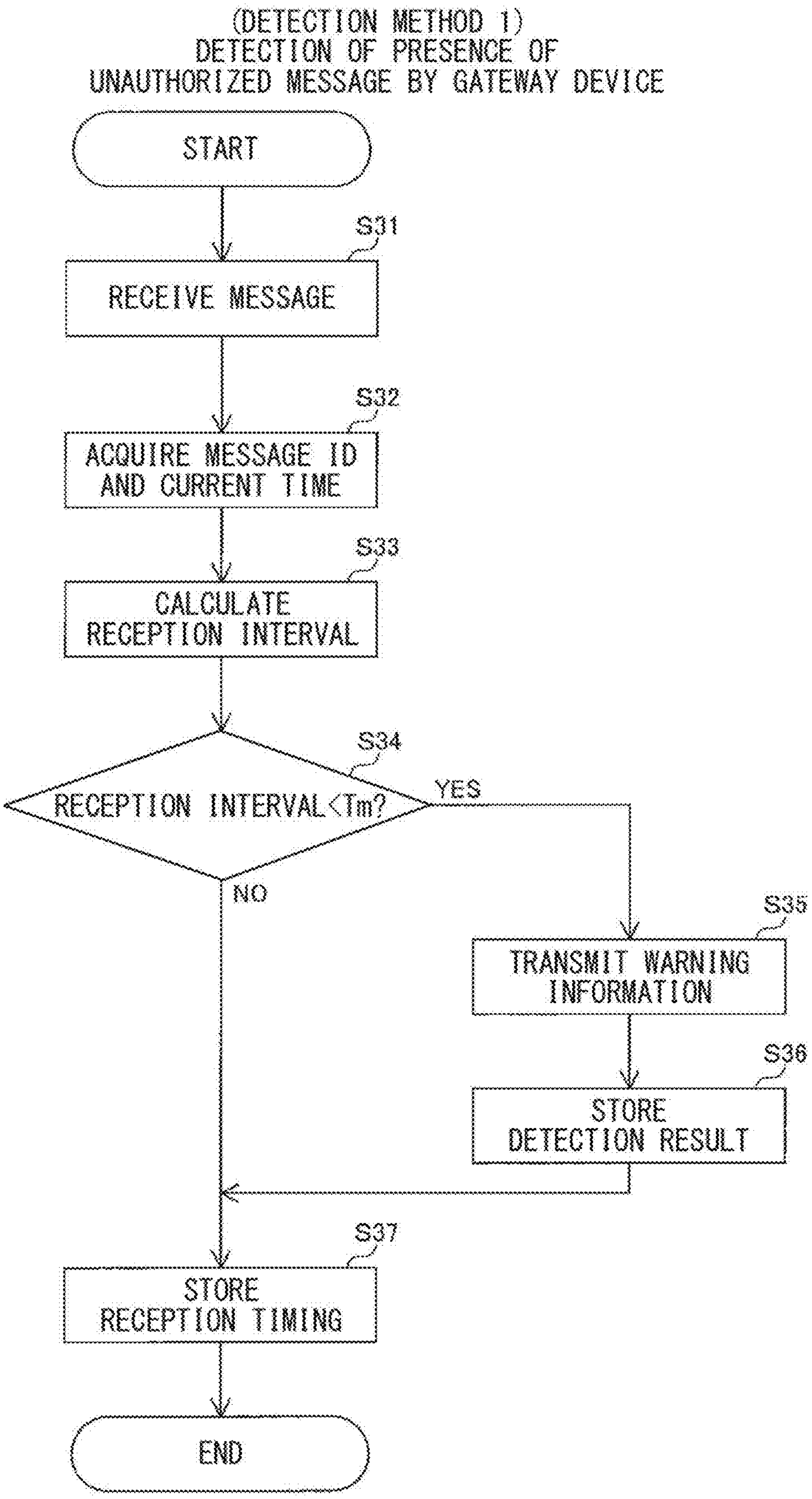
FIG. 19 is a flowchart showing an example of an operation procedure when the gateway device detects presence of an unauthorized message, according to the embodiment of the present disclosure.

FIG. 19 is a flowchart showing an example of an operation procedure when the gateway device detects presence of an unauthorized message, according to the embodiment of the present disclosure.

With reference to FIG. 19, upon receiving a message (step S31), the communication processing unit 51 outputs a reception notification of the message to the monitoring unit 52.

Next, upon receiving the reception notification from the communication processing unit 51, the monitoring unit 52 acquires a message ID and the current time included in the message received by the communication processing unit 51, and outputs them to the detection unit 54 (step S32).

Next, based on the message ID and the current time outputted from the monitoring unit 52, the detection unit 54 calculates a reception interval between the received message and the previously received message to which the message ID is added (step S33).

Next, the detection unit 54 confirms whether or not the calculated reception interval is shorter than the waiting time Tm (step S34).

When the calculated reception interval is shorter than the waiting time Tm ("YES" in step S34), the detection unit 54 determines that an unauthorized message is present in the in-vehicle network 12. Then, the detection unit 54 outputs, to the communication processing unit 51, a detection result indicating that presence of the unauthorized message has been detected. Based on the detection result from the detection unit 54, the communication processing unit 51 transmits, for example, warning information indicating presence of the unauthorized message to the higher-order device outside the vehicle 1 (step S35).

Next, the detection unit 54 stores, in the storage unit 53, the detection result indicating that presence of the unauthorized message has been detected, for example (step S36).

Next, the detection unit 54 stores, in the storage unit 53, the time confirmed in step S32 as the reception timing of the previously received message (step S37).

Meanwhile, when the reception interval calculated in step S33 is equal to or longer than the waiting time Tm ("NO" in step S34), the detection unit 54 determines that no unauthorized message is present in the in-vehicle network 12. Then, the detection unit 54 stores, in the storage unit 53, the time confirmed in step S32 as the reception timing of the previously received message (step S37).

[Detection Method 2]

(Operation of Control Device)

(a) Transmission of Periodic Message

Figure 20:
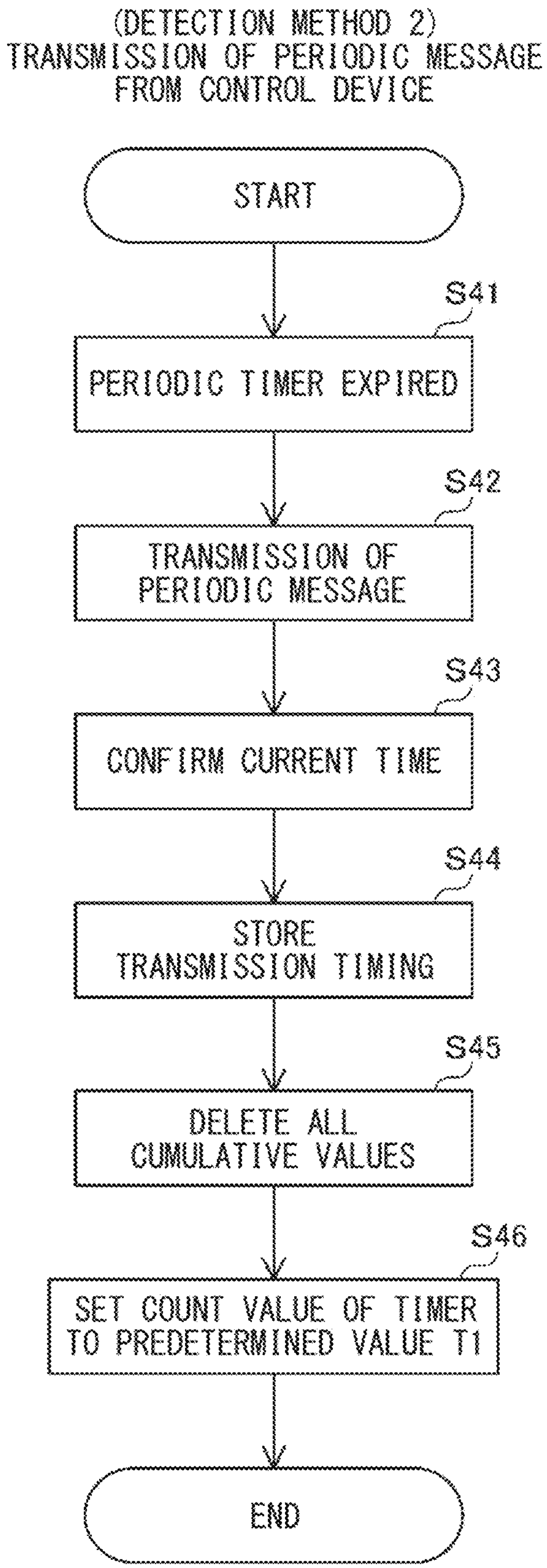
FIG. 20 is a flowchart showing an example of an operation procedure when the control device transmits a periodic message to the gateway device, according to the embodiment of the present disclosure.

FIG. 20 is a flowchart showing an example of an operation procedure when the control device transmits a periodic message to the gateway device, according to the embodiment of the present disclosure.

With reference to FIG. 20, the operation from step S41 to step S44 is identical to the operation from step S11 to step S14 shown in FIG. 17, and therefore, detailed description thereof is not repeated here.

Next, the transmission control unit 22, for example, deletes the entire history of cumulative values S1 of transmission intervals of messages, which is stored in the storage unit 23 (step S45). Next, the transmission control unit 22 sets the count value of the timer to the predetermined value T1 (step S46).

(b) Transmission of Event Message

Figure 21:
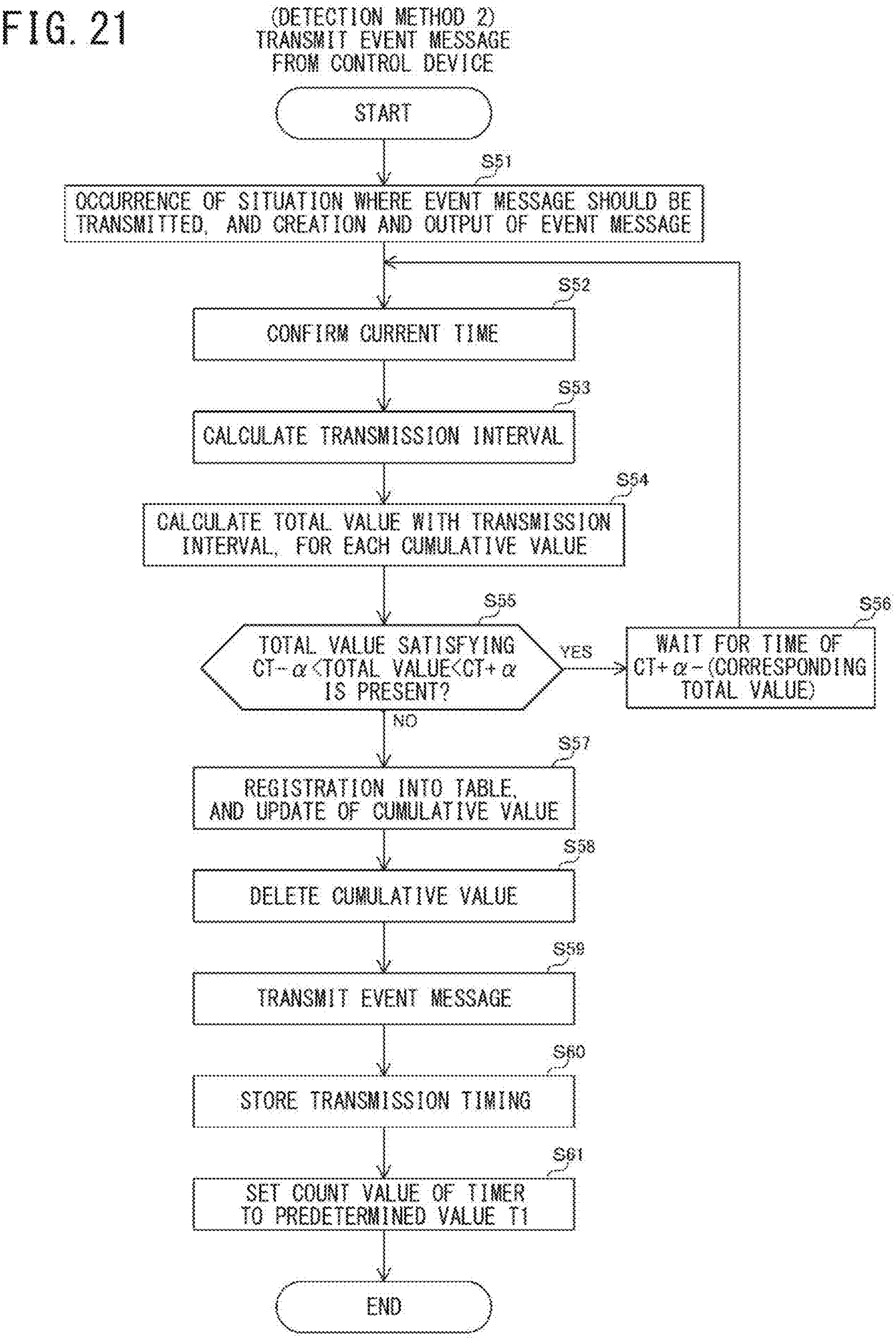
FIG. 21 is a flowchart showing an example of an operation procedure when the control device transmits an event message to the gateway device, according to the embodiment of the present disclosure.

FIG. 21 is a flowchart showing an example of an operation procedure when the control device transmits an event message to the gateway device, according to the embodiment of the present disclosure.

With reference to FIG. 21, the operation from step S51 to step S53 is identical to the operation from step S21 to step S23 shown in FIG. 18, and therefore, detailed description thereof is not repeated here.

Next, for each of elements of a table which is stored in the storage unit 23 and in which a history of cumulative values S1 of transmission intervals of messages is stored, the transmission control unit 22 calculates a total value of the element and the transmission interval calculated in step S53 (step S54).

Next, the transmission control unit 22 confirms whether or not there is a total value that satisfies a relational expression of $(CT-\alpha)<\text{total value}<(CT+\alpha)$, among one or a plurality of calculated total values (step S55).

Next, when there is a total value that satisfies the relational expression of $(CT-\alpha)<\text{total value}<(CT+\alpha)$ ("YES" in step S55), the transmission control unit 22 waits for a time of $(CT+\alpha-\text{the total value})$, for example (step S56). Then, the transmission control unit 22 performs the operation in and after step S52 again.

Meanwhile, when none of the one or the plurality of calculated total values satisfies the relational expression of $(CT-\alpha)<\text{total value}<(CT+\alpha)$ ("NO" in step S55), the transmission control unit 22 registers, in the table, the transmission interval calculated in step S53, and updates each element already registered in the table to a value obtained by adding the transmission interval to the element (step S57).

Next, when there is a cumulative value S1 that exceeds the predetermined time CT among the cumulative values S1 that are elements registered in the table, the transmission control unit 22 deletes the oldest cumulative value S1 from the table so that the cumulative value S1 does not exceed the predetermined time $CT+\alpha$ (step S58).

Next, the transmission control unit 22 transmits, to the gateway device 101, the event message created by the creation unit 21 in step S51 (step S59).

Next, the transmission control unit 22 stores, in the storage unit 23, the current time as an event message transmission timing (step S60). Then, the transmission control unit 22 sets the count value of the timer to the predetermined value T1 (step S61).

(Operation of Gateway Device)

Figure 22:
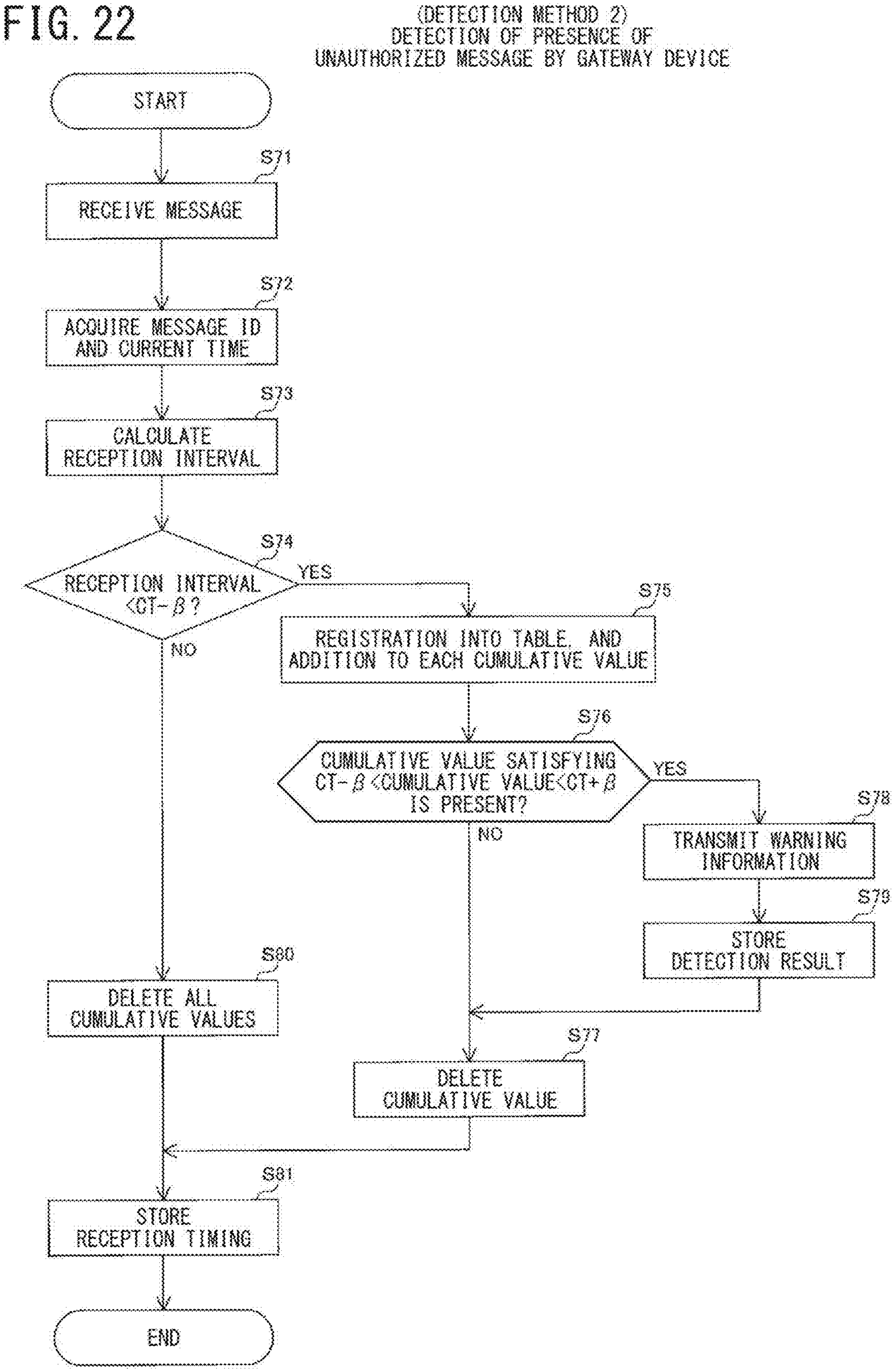
FIG. 22 is a flowchart showing an example of an operation procedure when the gateway device detects presence of an unauthorized message, according to the embodiment of the present disclosure.

FIG. 22 is a flowchart showing an example of an operation procedure when the gateway device detects presence of an unauthorized message, according to the embodiment of the present disclosure.

With reference to FIG. 22, the operation from step S71 to step S73 is identical to the operation from step S31 to step S33 shown in FIG. 19, and therefore, detailed description thereof is not repeated here.

Next, the detection unit 54 confirms whether or not the reception interval calculated in step S73 is shorter than the length obtained by subtracting the margin value β from the predetermined time CT (step S74).

Next, when the calculated reception interval is shorter than the length obtained by subtracting the margin value R from the predetermined time CT ("YES" in step S74), the detection unit 54 registers the calculated reception interval in the table which is stored in the storage unit 53 and in which the history of cumulative values S2 of reception intervals of messages is registered, and adds the reception interval to the reception interval cumulative values S2 that are elements already registered in the table (step S75).

Next, the detection unit 54 confirms whether or not there is a cumulative value S2 that satisfies a relational expression of $(CT-\beta)<\text{cumulative value S2}<(CT+\beta)$ among one or a plurality of cumulative values S2 registered in the table (step S76).

Next, when there is a cumulative value S2 that satisfies the relational expression of $(CT-\beta)<\text{cumulative value S2}<(CT+\beta)$ ("YES" in step S76), the detection unit 54 determines that an unauthorized message is present in the in-vehicle network 12. Then, the detection unit 54 outputs, to the communication processing unit 51, a detection result indicating that presence of the unauthorized message has been detected. Based on the detection result from the detection unit 54, the communication processing unit 51 transmits warning information indicating presence of the unauthorized message to the higher-order device outside the vehicle 1 (step S78).

Next, the detection unit 54 stores, in the storage unit 53, the detection result indicating that presence of the unauthorized message has been detected, for example (step S79).

Next, when there is a cumulative value S2 that exceeds the predetermined time CT among the cumulative values S2 that are the elements registered in the table, the detection unit 54 deletes the oldest cumulative value S2 from the table so that the cumulative value S2 does not exceed the predetermined time $CT+\beta$ (step S77).

Next, the detection unit 54 stores, in the storage unit 53, the time confirmed in step S72, as the reception timing of the previously received message (step S81).

Meanwhile, when the reception interval calculated in step S73 is equal to or longer than the length obtained by subtracting the margin value β from the predetermined time CT ("NO" in step S74), the detection unit 54 determines that the message received in step S71 is a periodic message, and deletes all the cumulative values S2 registered in the table (step S80).

Then, the detection unit 54 stores, in the storage unit 53, the time confirmed in step S72, as the reception timing of the previously received message (step S81).

The embodiments disclosed herein are merely illustrative in all aspects and should not be recognized as being restrictive. The scope of the present invention is defined by the scope of the claims rather than the meaning described above, and is intended to include meaning equivalent to the scope of the claims and all modifications within the scope.

The above description includes the features in the additional notes below.

[Additional Note 1]

An in-vehicle device configured to transmit, in an in-vehicle network, messages to which identification information is added, the messages including a periodic message and an event message, the in-vehicle device comprising:

a creation unit configured to create the periodic message and the event message: and a transmission control unit configured to transmit the periodic message and the event message created by the creation unit, wherein in transmitting the event message, after a waiting time elapses from a transmission timing of a previously transmitted message among the messages to which the identification information of the same value as that of the event message to be transmitted is added, the transmission control unit transmits the event message to which the identification information of the same value is added, the waiting time is longer than half a transmission cycle of the periodic message and is shorter than the transmission cycle, and the periodic message is a message to be transmitted after the transmission cycle from the transmission timing of the previously transmitted message to which the identification information of the same value is added, and the event message is a message to be non-periodically transmitted.

[Additional Note 2]

A detection device used in an in-vehicle network in which messages to which identification information is added are transmitted, the messages including a periodic message and an event message.

the detection device comprising:

a monitoring unit configured to monitor the messages;

a detection unit configured to detect presence of an unauthorized message in the in-vehicle network, based on a monitoring result of the monitoring unit; and a storage unit configured to store therein a reference value of reception intervals of the messages, wherein if a reception interval of successive messages, in a sequence of the messages to which the identification information of the same value is added and which are received in the detection device, is shorter than the reference value, the detection unit determines that an unauthorized message is present, in transmitting the event message, after a waiting time elapses from a transmission timing of a previously transmitted message among the messages to which the identification information of the same value as that of the event message to be transmitted is added, an in-vehicle device on a transmission side of the event message transmits the event message to which the identification information of the same value is added, and the reference value has the same length as the waiting time, is longer than half a transmission cycle of the periodic message, and is shorter than the transmission cycle.

[Additional Note 3]

An in-vehicle device configured to transmit, in an in-vehicle network, messages to which identification information is added, the messages including a periodic message and an event message, the in-vehicle device comprising:

a creation unit configured to create the periodic message and the event message, and a transmission control unit configured to transmit the periodic message and the event message created by the creation unit, wherein in successively transmitting event messages to which the identification information of the same value is added, if a cumulative value of a transmission interval between an event message and a previously transmitted message matches a transmission cycle of the periodic message or is within a range obtained by adding a predetermined margin value to the transmission cycle, the transmission control unit delays a transmission timing of an event message to be currently transmitted so that the cumulative value exceeds the range, the transmission control unit resets the cumulative value when transmitting the periodic message, the periodic message is a message that is transmitted after the transmission cycle from a transmission timing of a previous message to which the identification information of the same value is added, and the event message is a message to be non-periodically transmitted, and the transmission control unit transmits the event message before a length corresponding to half the transmission cycle elapses from the transmission timing of the previous message to which the identification information of the same value is added.

[Additional Note 4]

A detection device used in an in-vehicle network in which messages to which identification information is added are transmitted, the messages including a periodic message and an event message, the detection device comprising:

a monitoring unit configured to monitor the messages;

a detection unit configured to detect presence of an unauthorized message in the in-vehicle network, based on a monitoring result of the monitoring unit; and a storage unit configured to store therein a transmission cycle of the periodic message, wherein if a cumulative value of a reception interval between a message that is currently received in the detection device and a message that has been previously received in the detection device, these messages being given the identification information of the same value, matches the transmission cycle stored in the storage unit or is within a range obtained by adding a predetermined margin value to the transmission cycle, the detection unit determines that an unauthorized message is present, and if a reception interval between the message currently received in the detection device and the message that has been previously received in the detection device, these messages being given the identification information of the same value, is shorter than a length obtained by subtracting the margin value from the transmission cycle, the detection unit resets the cumulative value.

REFERENCE SIGNS LIST

1 vehicle
12 in-vehicle network
13, 14 bus
21 creation unit
22 transmission control unit
23 storage unit
51 communication processing unit
52 monitoring unit

53 storage unit
54 detection unit
101 gateway device (detection device)
111 in-vehicle communication device
121 bus connection device group
122 control device
301 in-vehicle communication system

The invention claimed is:

1. An in-vehicle device configured to transmit, in an in-vehicle network, messages to which identification information is added, the messages including a periodic message and an event message, the in-vehicle device comprising:

a processor configured to:

create the periodic message and the event message, and control transmission of the periodic message and the event message, wherein in transmitting the event message, after a waiting time elapses from a transmission timing of a previously transmitted message among the messages to which the identification information of the same value as that of the event message to be transmitted is added, the processor transmits the event message to which the identification information of the same value is added, the waiting time is longer than half a transmission cycle of the periodic message and is shorter than the transmission cycle, the waiting time is set such that a reception interval between successive messages bearing the same identification information, as monitored in a detection device on the in-vehicle network, is at least the waiting time when the messages originate from the in-vehicle device, thereby enabling the detection device to identify a reception interval shorter than the waiting time as indicating an unauthorized message, and the event message is a message to be non-periodically transmitted.

2. A transmission control method in an in-vehicle device, the method comprising:

creating a periodic message and an event message to which identification information is added, as messages to be transmitted in an in-vehicle network; and transmitting the created periodic message and event message, wherein in transmitting the event message, after a waiting time elapses from a transmission timing of a previously transmitted message among the messages to which the identification information of the same value as that of the event message to be transmitted is added, the event message to which the identification information of the same value is added is transmitted, the waiting time is longer than half a transmission cycle of the periodic message and is shorter than the transmission cycle, the waiting time is set such that successive messages bearing the same identification information, when originating from the in-vehicle device, arrive at a detection device on the in-vehicle network with a reception interval of at least the waiting time, thereby enabling the detection device to identify a reception interval shorter than the waiting time as indicating an unauthorized message, and the event message is a message to be non-periodically transmitted.

3. The in-vehicle device according to claim 1, wherein the processor is further configured to:

store a waiting time value in a memory of the in-vehicle device, the waiting time value being computed as a function of the transmission cycle of the periodic message; and retrieve the waiting time value from the memory upon determining to transmit the event message.

4. The in-vehicle device according to claim 1, wherein the waiting time is set so that a reception interval between consecutive messages having the identification information of the same value, as received at any monitoring node on the in-vehicle network, is at least the waiting time when all such messages originate from the in-vehicle device.

5. The in-vehicle device according to claim 1, wherein the in-vehicle network is a controller area network (CAN), and the identification information is a CAN identifier.

6. The in-vehicle device according to claim 1, wherein the processor is further configured to determine, based on a time elapsed since the previously transmitted message, whether the waiting time has elapsed, and to withhold transmission of the event message until the waiting time has elapsed.

7. The in-vehicle device according to claim 1, wherein the processor is further configured to store a transmission timing of each transmitted message in a nonvolatile memory of the in-vehicle device, and wherein the stored transmission timing serves as a reference for calculating a transmission interval when the next event message is to be transmitted.

8. The in-vehicle device according to claim 7, wherein the processor is further configured to calculate the transmission interval as a time period from the stored transmission timing of a previously transmitted message, having the same identification information as that of the event message to be transmitted, to a current time.

9. The in-vehicle device according to claim 1, wherein the processor is further configured to add different identification information to each of a plurality of messages to be transmitted from the in-vehicle device, whereby each message is individually identifiable by the detection device monitoring the in-vehicle network.

10. The in-vehicle device according to claim 1, wherein the processor is further configured to: confirm, upon determining to transmit the event message, a cumulative value of transmission intervals of previously transmitted messages having the same identification information; delay the transmission timing of the event message when the cumulative value satisfies a condition that the cumulative value is within a range defined by a predetermined margin value added to the transmission cycle; and transmit the event message at a timing at which the cumulative value exceeds the range.

11. The in-vehicle device according to claim 10, wherein the processor is further configured to delete an oldest cumulative value among registered cumulative values so that the cumulative value does not exceed the transmission cycle plus the predetermined margin value.

12. The in-vehicle device according to claim 10, wherein the processor is further configured to delete all registered cumulative values upon transmitting the periodic message.

13. The in-vehicle device according to claim 1, wherein the in-vehicle network further comprises a gateway device configured to monitor messages transmitted in the in-vehicle network, the gateway device including a detection unit configured to detect presence of an unauthorized message in the in-vehicle network based on a reception interval of successive messages having the same identification information.

14. The in-vehicle device according to claim 13, wherein the detection unit of the gateway device is configured to determine that an unauthorized message is present in the in-vehicle network when the reception interval of the successive messages is shorter than the waiting time.

15. The in-vehicle device according to claim 13, wherein the gateway device is further configured to transmit warning information indicating presence of the unauthorized message to a higher-order device inside or outside the vehicle upon detection of the unauthorized message by the detection unit.

16. The transmission control method according to claim 2, further comprising storing a transmission timing of each transmitted message in a memory after transmission of the message, wherein the stored transmission timing is used to calculate the transmission interval when determining whether the waiting time has elapsed.

17. The transmission control method according to claim 2, further comprising: creating a list of transmission interval values of successive event messages having the same identification information, or a history of cumulative values of the transmission intervals; and confirming, based on the list or history, whether a cumulative value of the transmission intervals satisfies a predetermined condition prior to transmitting the event message.

18. The transmission control method according to claim 17, further comprising deleting an oldest value from the list or history when the cumulative value exceeds the transmission cycle plus a predetermined margin value, so that the cumulative value does not exceed the transmission cycle plus the predetermined margin value.

19. The transmission control method according to claim 17, further comprising deleting all registered cumulative values upon transmitting the periodic message.

20. The in-vehicle device according to claim 5, wherein the identification information is a message identifier (ID) that indicates the in-vehicle device as a transmission source of the message in the controller area network.

* * * * *